(12) United States Patent
Martin

(10) Patent No.: US 9,227,800 B2
(45) Date of Patent: Jan. 5, 2016

(54) MULTI-FUNCTION CARD HANDLING APPARATUS AND METHODS OF OPERATION

(71) Applicant: Coinstar, Inc., Bellevue, WA (US)

(72) Inventor: Douglas A. Martin, Woodinville, WA (US)

(73) Assignee: Outerwall Inc., Bellevue, WA (US)

( * ) Notice: Subject to any disclaimer, the term of this patent is extended or adjusted under 35 U.S.C. 154(b) by 59 days.

(21) Appl. No.: 13/803,559

(22) Filed: Mar. 14, 2013

(65) Prior Publication Data

US 2014/0263385 A1  Sep. 18, 2014

(51) Int. Cl.
| | |
|---|---|
| G07F 11/44 | (2006.01) |
| B65H 5/06 | (2006.01) |
| G06Q 20/18 | (2012.01) |
| G06Q 20/28 | (2012.01) |
| G06Q 20/34 | (2012.01) |
| G07F 11/00 | (2006.01) |
| G07F 11/24 | (2006.01) |
| B65H 3/24 | (2006.01) |

(52) U.S. Cl.
CPC ............... B65H 5/068 (2013.01); B65H 3/24 (2013.01); G06Q 20/18 (2013.01); G06Q 20/28 (2013.01); G06Q 20/347 (2013.01); G06Q 20/3558 (2013.01); G07F 11/002 (2013.01); G07F 11/24 (2013.01); G07F 11/44 (2013.01); B65H 2701/1914 (2013.01)

(58) Field of Classification Search
CPC ........ G07F 19/20; G07F 19/202; G07F 7/025
USPC ...................... 221/66, 102, 266; 700/231, 232
See application file for complete search history.

(56) References Cited

U.S. PATENT DOCUMENTS

| | | |
|---|---|---|
| 3,655,092 A | 4/1972 | Hall et al. |
| 3,757,917 A | 9/1973 | Waiwood et al. |
| 3,947,118 A | 3/1976 | Amort |

(Continued)

FOREIGN PATENT DOCUMENTS

| | | |
|---|---|---|
| DE | 3147603 | 6/1983 |
| EP | 0313294 | 4/1989 |

(Continued)

OTHER PUBLICATIONS

Sheehan, Michael, "Marriage of Convenience," 3 pages http://www.kioskbusiness.com/NovDec01/articles/article4.html [accessed May 16, 2003].

(Continued)

*Primary Examiner* — Patrick Mackey
(74) *Attorney, Agent, or Firm* — Perkins Coie LLP

(57) ABSTRACT

A multi-function card dispenser and related apparatuses, systems, and methods for processing credit cards, phone cards, in-store gift cards, and the like at customer-operated kiosks and other machines. In one embodiment, a card apparatus can include a card hopper having a card eject surface and a card track having a card transport surface positioned below the card eject surface. A first roller is configured to rotate to draw a first card from a card port and onto the card track. A second roller is configured to rotate to dispense a second (ejected) card from the card hopper and onto the card track and further toward the card port. In one embodiment, the second roller is further configured to rotate to deposit cards below the card hopper.

23 Claims, 13 Drawing Sheets

(56) References Cited

U.S. PATENT DOCUMENTS

| | | | |
|---|---|---|---|
| 3,999,747 A * | 12/1976 | Digilio et al. ............... 271/135 |
| 4,252,250 A | 2/1981 | Toth |
| 4,322,067 A | 3/1982 | Masselin et al. |
| 4,687,119 A | 8/1987 | Juillet |
| 4,825,054 A | 4/1989 | Rust et al. |
| 5,010,997 A | 4/1991 | Matsuo et al. |
| 5,106,260 A | 4/1992 | Obrecht |
| 5,176,237 A * | 1/1993 | Yang ........................... 194/211 |
| 5,271,628 A | 12/1993 | Okada |
| 5,350,906 A | 9/1994 | Brody et al. |
| 5,365,046 A | 11/1994 | Haymann |
| 5,368,286 A | 11/1994 | Horsman et al. |
| 5,457,305 A | 10/1995 | Akel et al. |
| 5,531,640 A | 7/1996 | Inoue |
| 5,555,497 A | 9/1996 | Helbling |
| 5,564,546 A | 10/1996 | Molbak et al. |
| 5,577,959 A | 11/1996 | Takemoto et al. |
| 5,584,589 A | 12/1996 | Adkins et al. |
| 5,637,845 A | 6/1997 | Kolls |
| 5,665,952 A | 9/1997 | Ziarno |
| 5,699,328 A | 12/1997 | Ishizaki et al. |
| 5,743,429 A * | 4/1998 | Morofsky ......................... 221/7 |
| 5,746,299 A | 5/1998 | Molbak et al. |
| 5,799,767 A | 9/1998 | Molbak |
| 5,839,956 A | 11/1998 | Takemoto et al. |
| 5,857,588 A | 1/1999 | Kasper |
| 5,949,046 A | 9/1999 | Kenneth et al. |
| 5,974,146 A | 10/1999 | Randle et al. |
| 6,102,248 A | 8/2000 | Yamamiya |
| 6,105,009 A | 8/2000 | Cuervo |
| 6,116,402 A | 9/2000 | Beach et al. |
| 6,129,275 A | 10/2000 | Urquhart et al. |
| 6,138,106 A | 10/2000 | Walker et al. |
| 6,144,946 A | 11/2000 | Iwamura et al. |
| 6,149,064 A | 11/2000 | Yamaoka et al. |
| 6,185,545 B1 | 2/2001 | Resnick et al. |
| 6,230,928 B1 | 5/2001 | Hanna et al. |
| 6,233,564 B1 | 5/2001 | Schulze, Jr. |
| 6,253,955 B1 | 7/2001 | Bower |
| 6,289,324 B1 | 9/2001 | Kawan |
| 6,318,536 B1 | 11/2001 | Korman et al. |
| 6,405,182 B1 | 6/2002 | Cuervo |
| 6,415,262 B1 | 7/2002 | Walker et al. |
| 6,494,365 B1 * | 12/2002 | Kozakai et al. ............... 235/380 |
| 6,494,776 B1 | 12/2002 | Molbak |
| 6,527,139 B2 | 3/2003 | Seagle |
| 6,597,970 B1 | 7/2003 | Steury et al. |
| 6,659,259 B2 * | 12/2003 | Knox et al. ................... 194/217 |
| 6,786,355 B2 | 9/2004 | Chirnomas |
| 6,805,286 B2 | 10/2004 | Hilton et al. |
| 6,957,746 B2 | 10/2005 | Martin et al. |
| 7,044,330 B2 | 5/2006 | Chirnomas |
| 7,044,332 B2 | 5/2006 | Giegerich et al. |
| 7,128,261 B1 | 10/2006 | Henderson et al. |
| 7,156,300 B1 | 1/2007 | Dentlinger |
| 7,255,268 B2 | 8/2007 | Dentlinger |
| 7,377,507 B2 | 5/2008 | Yamamiya |
| 7,520,374 B2 | 4/2009 | Martin et al. |
| 7,653,599 B2 | 1/2010 | Doran et al. |
| 7,677,565 B2 | 3/2010 | Grauzer et al. |
| 7,685,432 B2 | 3/2010 | Mochizuki |
| 7,748,619 B2 * | 7/2010 | Martin et al. ................. 235/381 |
| 7,815,071 B2 * | 10/2010 | Martin et al. ..................... 221/92 |
| 7,865,432 B2 | 1/2011 | Doran et al. |
| 7,874,478 B2 | 1/2011 | Molbak |
| 7,967,191 B1 | 6/2011 | Enright et al. |
| 8,028,989 B2 * | 10/2011 | Kitagawa et al. ............. 271/213 |
| 8,033,375 B2 * | 10/2011 | Doran et al. .................. 194/217 |
| 8,038,059 B2 | 10/2011 | Martin et al. |
| 8,131,398 B2 | 3/2012 | Fan et al. |
| 8,332,313 B2 | 12/2012 | Doran et al. |
| 8,550,294 B2 * | 10/2013 | Martin ........................... 221/131 |
| 2001/0050288 A1 | 12/2001 | Seagle |
| 2002/0026423 A1 | 2/2002 | Maritzen et al. |
| 2003/0010827 A1 | 1/2003 | Hilton et al. |
| 2003/0094463 A1 | 5/2003 | Chirnomas |
| 2003/0141315 A1 | 7/2003 | Chirnomas |
| 2003/0155370 A1 | 8/2003 | Martin et al. |
| 2004/0067789 A1 | 4/2004 | Grauzer et al. |
| 2004/0079615 A1 | 4/2004 | Furneaux |
| 2005/0139606 A1 | 6/2005 | Martin et al. |
| 2006/0207856 A1 | 9/2006 | Dean et al. |
| 2007/0069462 A1 | 3/2007 | Downs et al. |
| 2007/0125620 A1 | 6/2007 | Sorenson et al. |
| 2007/0125845 A1 | 6/2007 | Martin et al. |
| 2007/0176349 A1 | 8/2007 | Gerlier et al. |
| 2008/0162299 A1 * | 7/2008 | Gusler et al. ..................... 705/26 |
| 2008/0164279 A1 | 7/2008 | Chirnomas et al. |
| 2008/0203157 A1 * | 8/2008 | Thorsen et al. ............... 235/382 |
| 2009/0045255 A1 | 2/2009 | Adams |
| 2010/0327005 A1 | 12/2010 | Martin et al. |
| 2011/0007166 A1 | 1/2011 | Forestier et al. |
| 2011/0042403 A1 | 2/2011 | Martin |
| 2013/0086973 A1 | 4/2013 | Martin et al. |

FOREIGN PATENT DOCUMENTS

| | | |
|---|---|---|
| EP | 0857579 A2 | 8/1998 |
| EP | 1178448 | 2/2002 |
| GB | 2188467 | 9/1987 |
| JP | 1246698 A | 10/1989 |
| JP | 3-63795 | 3/1991 |
| JP | 2000094871 | 4/2000 |
| WO | WO-9950785 | 10/1999 |

OTHER PUBLICATIONS

Tranax Technologies, Inc., "Card Dispenser," 2007, 1 page, <http://www.tranax.com/products/self-service.sub.--products/accessories/index.cfm?product=carddisp>, [internet accessed on Aug. 11, 2009].

Non-Final Office Action; U.S. Appl. No. 12/877,261; Mailed on May 2, 2011; 21 pgs.

* cited by examiner

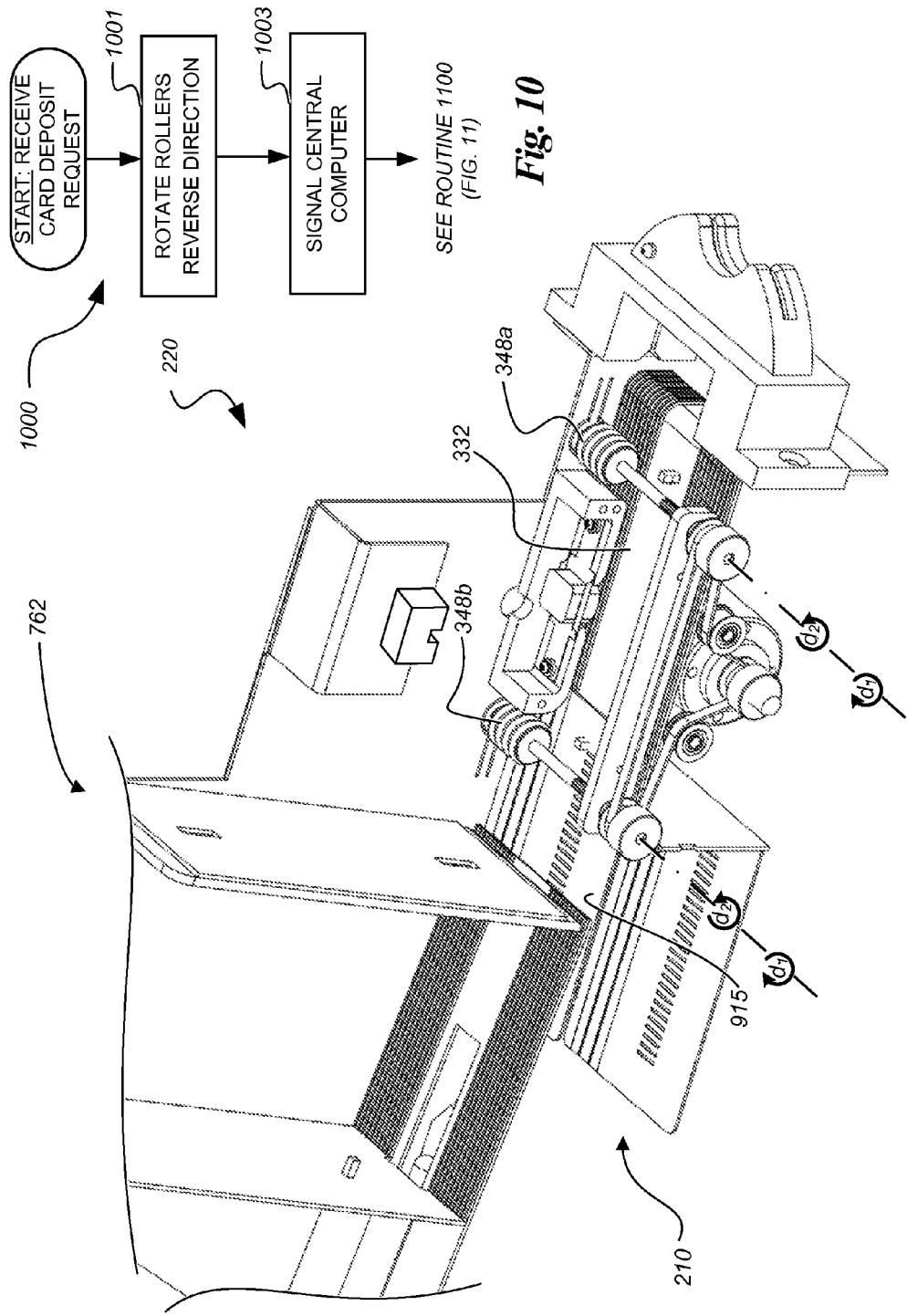

MULTI-FUNCTION CARD HANDLING APPARATUS AND METHODS OF OPERATION

TECHNICAL FIELD

The following disclosure relates generally to systems, apparatuses, and methods for dispensing and/or accepting cards, such as wallet-sized, cards and the like at kiosks and other structures.

BACKGROUND

Various types of vending machines and kiosks dispense prepaid credit cards, debit cards, phone cards, and the like to customers. Such machines typically include a user interface for selecting a card, a monetary input device for receiving payment (e.g., a credit card reader or bill acceptor), and an outlet for dispensing the card to the customer. To purchase a card, the customer selects a desired card and deposits the required funds. Once the machine has confirmed payment, a card dispenser housed within the machine dispenses the desired card to the consumer via the outlet.

FIG. 1 is an isometric view of a card dispenser 100 configured in accordance with the prior art. The card dispenser 100 includes a card hopper 102 containing a plurality of cards 101, a card conveyor 104, a card reader 106, and a card outlet 108. In a typical card vending machine, the card dispenser 100 is housed within the machine so that only the card outlet 108 is exposed. In operation, after a user has selected a desired card and deposited the required funds, the card conveyor 104 removes the bottom-most card 101 from the hopper 102 and moves the card forward past the card reader 106.

As the card moves past the card reader 106, the card reader 106 reads information off a magnetic stripe on the card. The magnetic stripe can include one or more "tracks" of information. The information can include a unique code for associating the card with a particular account. For example, if the card is a prepaid credit card, then the code can be associated with a specific credit card account. Similarly, if the card is a prepaid phone card, then the code can be associated with a specific long-distance account. After moving past the card reader 106, the card conveyor 104 pushes the card through the outlet 108 to the user.

BRIEF DESCRIPTION OF THE DRAWINGS

FIG. 9 is a partial, front isometric view of the multi-function card handling apparatus of FIGS. 3A and 3B configured in accordance with an embodiment of the present technology.

FIG. 10 is a flow diagram illustrating a routine for receiving a card with the multi-function card handling apparatus of FIGS. 3A and 3B in accordance with an embodiment of the present technology.

DETAILED DESCRIPTION

Figure 1:
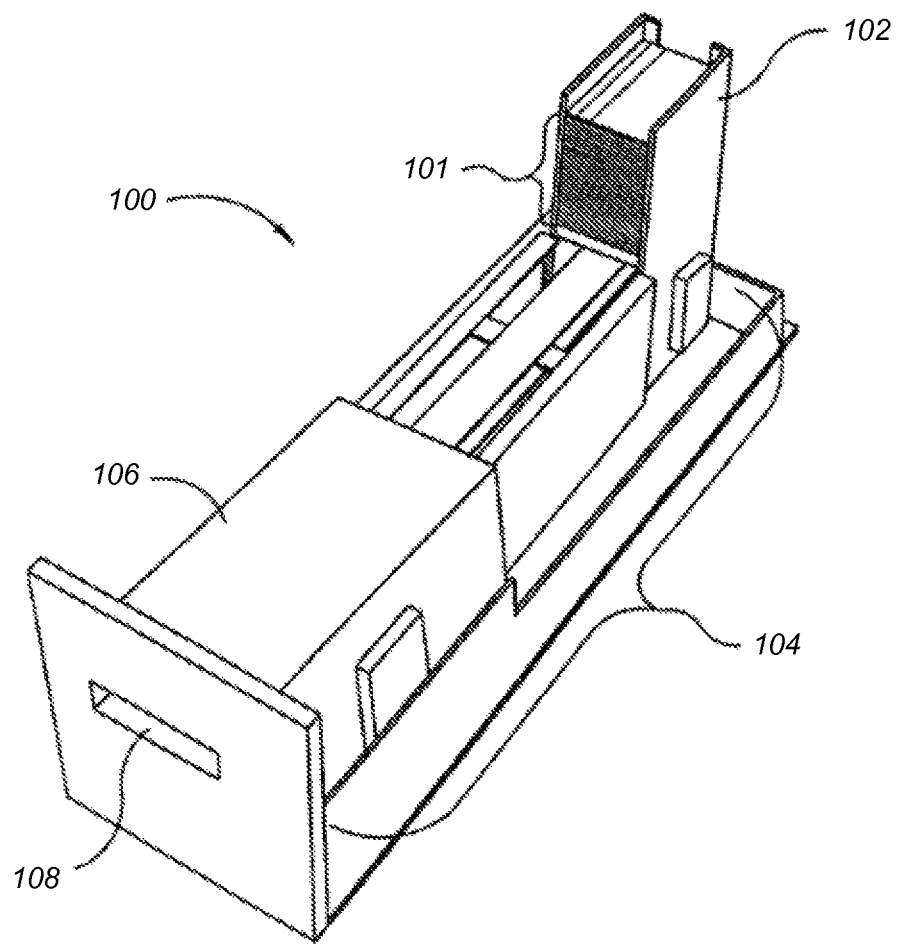
FIG. 1 is an isometric view of a card dispenser configured in accordance with the prior art.

The following disclosure describes various embodiments of apparatuses, systems, and methods for dispensing and receiving various types of cards (e.g., wallet-sized credit cards, debit cards, phone cards, gift cards, and the like) and/or other items from or with vending machines, kiosks and/or other structures. The cards can have physical properties defined by one or more of the International Organization for Standardization (ISO) standards, which are commonly used for banking cards (ATM cards, credit cards, debit cards, etc.). The ISO standards can include ISO/IEC 7810 ID-1, ISO/IEC 7811, ISO/IEC 7812, ISO/IEC 7813, ISO 8583, and ISO 4909. These standards can define, for example, card size (e.g., 3.370 in.×2.125 in.), card flexibility, and magstripe location, magnetic characteristics, and data formats. The ISO standards can also provide standards for financial cards, including the allocation of card number ranges to different card issuing institutions. In addition or alternatively, the cards can also include features defined by the ABA (American Banking Association) CR-80 standard. The apparatuses, systems and methods disclosed herein can also include various features for reading information from, and for writing information to, various types of storage media on cards. Such media can include, for example, magnetic media (e.g., magnetic stripes or "magstripes") complying with one or more ISO standards, optical media, barcodes, memory chips, embedded integrated circuits, radio frequency tags, transponder devices, etc.

Certain embodiments of the apparatuses and methods described herein are described in the context of computer-executable instructions performed by a general-purpose computer or other processing equipment. In one embodiment, these computer-executable instructions can be stored on a computer-readable medium, such as a floppy disk, hard disk, CD-ROM, etc. In other embodiments, these instructions can be stored on a server computer system and accessed via a communications link or a computer network, such as an intranet, the Internet, or other computer network. Because the basic structures and functions related to computer-readable routines and corresponding implementations are known, they have not been shown or described in detail here to avoid unnecessarily obscuring the described embodiments.

Certain details are set forth in the following description and in FIGS. 1-11 to provide a thorough understanding of various embodiments of the present technology. Those of ordinary skill in the relevant art will appreciate, however, that the invention can have additional embodiments that may be practiced without several of the details described below. In addition, some well-known structures and systems often associated with card dispensing apparatuses and methods have not been shown or described in detail below to avoid unnecessarily obscuring the description of the various embodiments of the present technology.

The dimensions, angles, and other specifications shown in the figures are merely illustrative of particular embodiments of the present technology. Accordingly, other embodiments can have other dimensions, angles, and specifications without departing from the spirit or scope of the present technology.

In the drawings, identical reference numbers identify identical, or at least generally similar elements. To facilitate the discussion of any particular element, the most significant digit or digits in any reference number refers to the figure in which that element is first introduced. For example, element 210 is first introduced and discussed with reference to FIG. 2.

Multi-Function Card Handling Apparatus

Figure 2:
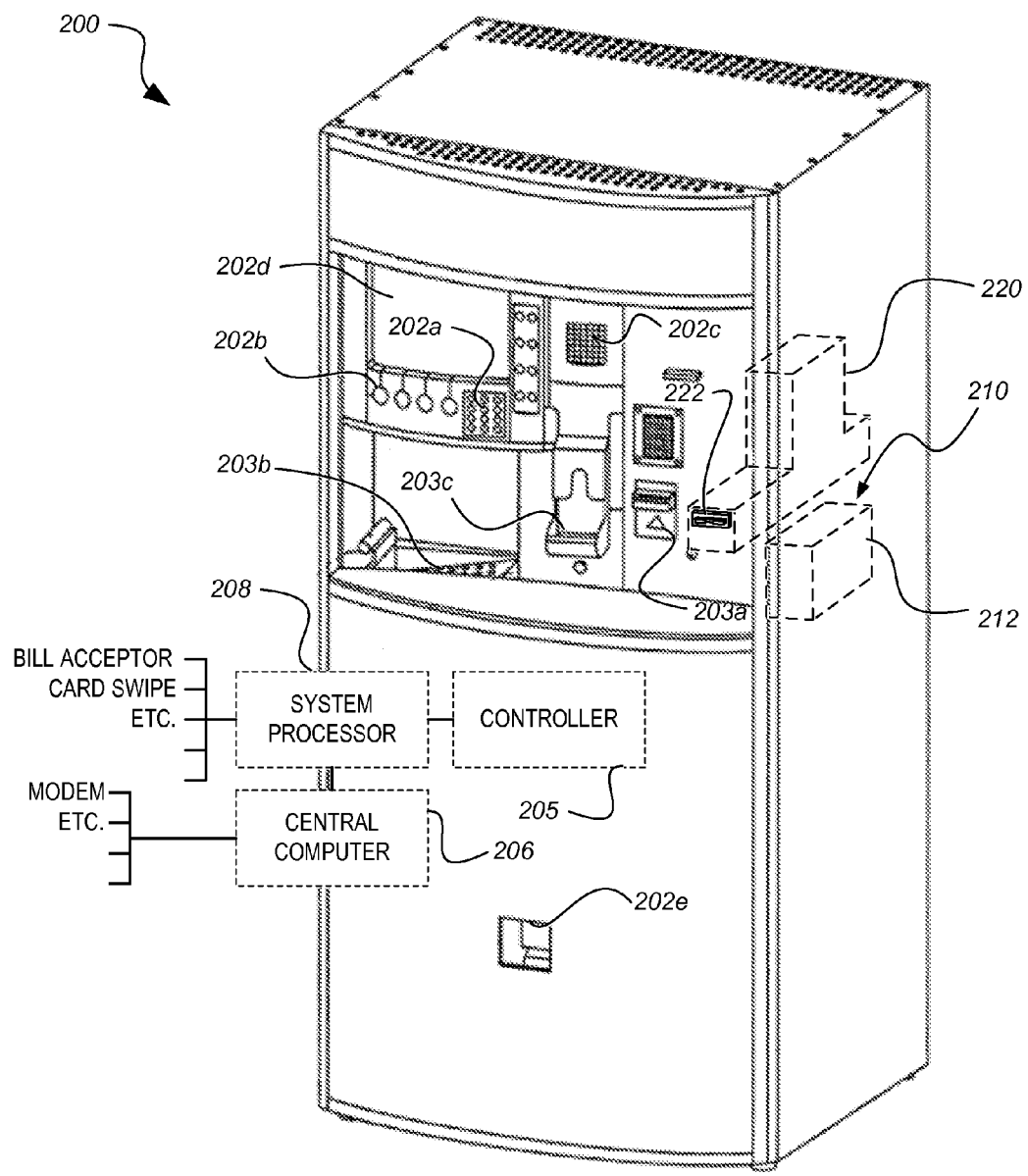
FIG. 2 is a partially schematic, front isometric view of a card vending kiosk housing a multi-function card handling apparatus configured in accordance with an embodiment of the present technology.

FIG. 2 is a partially schematic, front isometric view of a card vending kiosk 200 housing a multi-function card handling apparatus 220 ("card apparatus 220") configured in accordance with an embodiment of the present technology. As described in greater detail below, the card apparatus 220 can perform multiple card processing operations via a common card port 222 accessibly positioned at the exterior of the kiosk 200. In brief, these functions can include (i) intaking a card at the card port 222, (ii) reading/writing to a card, (iii) dispensing a card from the card port 222, and/or or (iv) collecting a card in an interior including bin 212 (shown schematically). In one aspect of this embodiment, the card apparatus 220 can hold about 150 wallet-sized cards, such as 0.030 inch thick flat or embossed style cards. Each of the cards can include a magnetic stripe (e.g., a conventional magnetic stripe with three tracks of data), one or more barcodes (in, e.g., various different formats), etc. In other embodiments, the cards can have other sizes and other information storage features.

In one aspect of this embodiment, the kiosk 200 includes features at least generally similar in structure and function to corresponding features of the kiosks and coin-counting machines described in U.S. Pat. Nos. 6,494,776; 6,957,746; and 7,748,619 which are incorporated herein in their entireties by reference. In other embodiments, however, various aspects of the kiosk 200 can differ from the machines and kiosks described in these references depending on the particular application. Further, the card apparatus 220 described herein can be used in a wide variety of kiosks, vending machines, and other machines for dispensing cards, such as wallet-sized credit cards, phone cards, in-store gift cards, etc. For example, in various embodiments, the card apparatus 220 disclosed herein can be used with the kiosks and other card systems described in U.S. Pat. Nos. 8,332,313; 8,038,059; 8,033,375; 7,815,071; 7,685,432; 7,653,599; 6,957,746 and U.S. Publication Nos.: 2011/007166A1; 2010/0327005; 2007/0125620A1; and 2006/0207856, which are incorporated herein in their entireties by reference.

In the illustrated embodiment, the kiosk 200 further includes user-interface devices 202 and payment devices 203. The user-interface devices 202 can include, for example, a keypad 202a, user selection buttons 202b, a speaker 202c, a display screen 202d, a printer (not visible) in communication with a printer outlet 202e, and/or other suitable interface devices known in the art. The payment devices can include, for example, a bill acceptor 203a, a coin input tray 203b, a coin return 203c, and/or other suitable payment devices known in the art. In some embodiments, the kiosk 200 can include other devices in addition to or in lieu of one or more of the user-interface devices 202 and/or the payment devices 203. For example, in some embodiments the coin input tray 203b and the coin return 203c can be omitted. Additionally, the kiosk 200 can include various indicia, signs, displays, advertisements and the like on its external surfaces. The kiosk 200 and various portions, aspects and features thereof can be at least generally similar in structure and function to one or more of the machines described in the U.S. patent application Ser. No. 13/269,121 and U.S. Pat. Nos. 7,520,374; 7,865,432; and 7,874,478, which are incorporated herein in their entireties by reference.

In another aspect of this embodiment, a controller 205 is operably coupled to the card apparatus 220 and optionally coupled to various other kiosk devices of the kiosk 200. As described in greater detail below, the controller 205 can control operation of various components of the card apparatus 220 in response to signals from a "data funnel" or a processor 208. The processor 208 transmits control signals to, and exchanges data with, the controller 205 in response to signals received from a central computer 206 and/or one or more of the payment devices 203. In the illustrated embodiment, the central computer 206 can initiate, suspend, and/or terminate (i.e., via the processor 208) various routines of the controller 205 for operating the card apparatus 220. In addition, the central computer 206 can receive user instructions, such as card selections and/or payment choices, via one or more of the user-interface devices 202 and/or payment devices 203. In this embodiment, the central computer 206 can also enable modem connections to remote computers in a computer network. Such connections can facilitate the exchange of data, such as a card purchase and/or card account data, with one or more remote computers.

As those of ordinary skill in the art will appreciate, the present invention is not limited to the foregoing arrangement of processors and controllers. For example, in another embodiment, the processor 208 can be omitted. In this embodiment, the central computer 206 can transmit control signals directly to, and exchange data directly with, the controller 205 for control of the card apparatus 220.

In one embodiment, the kiosk 200 can be networked via the central computer 206 (FIG. 2) to other card vending machines and/or remote computer systems to exchange information related to card purchases. Such information can include, for example, bank account and credit/debit card account information, in addition to long-distance calling card account information. Such information can also include information related to exchanging gift cards and/or reselling previously exchanged gift cards. In another embodiment, the kiosk 200 can be networked to one or more remote computer systems and configured to transmit an appropriate signal when the machine is out of one or more types of cards. Service personnel with access to the remote computer system can then respond to the signal by restocking the machine with the needed cards. At this same time, the service personnel can also collect cards that have been deposited into the card collection bin 212. Similar signals can be transmitted from the kiosk 200 to the remote computer when the machine is malfunctioning, jammed, full of coins or other currency, and/ or subject to theft, vandalism, or another form of tampering.

(i) Card Intake

Figure 3A:
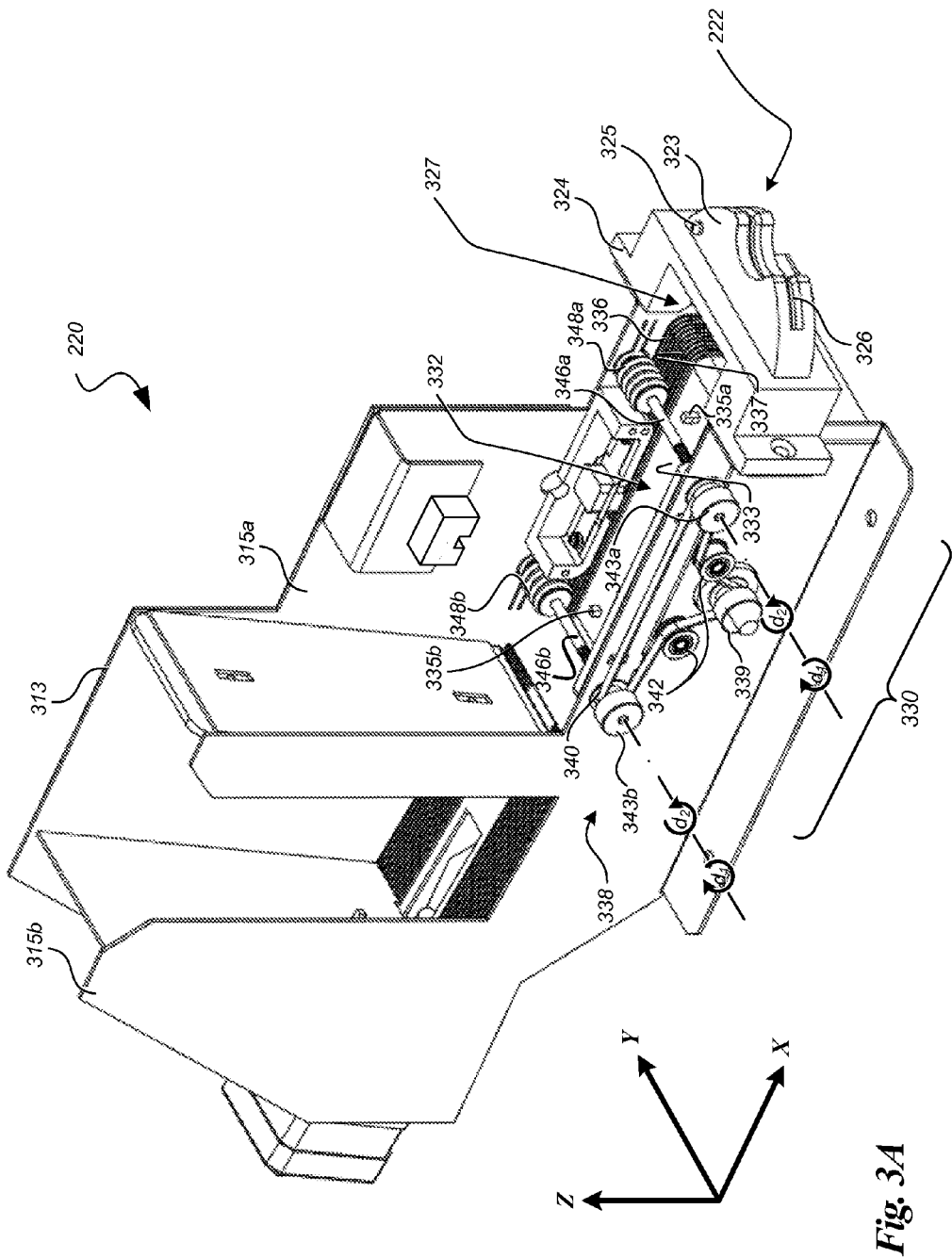
FIG. 3A is a front left-side isometric view.
Figure 3B:
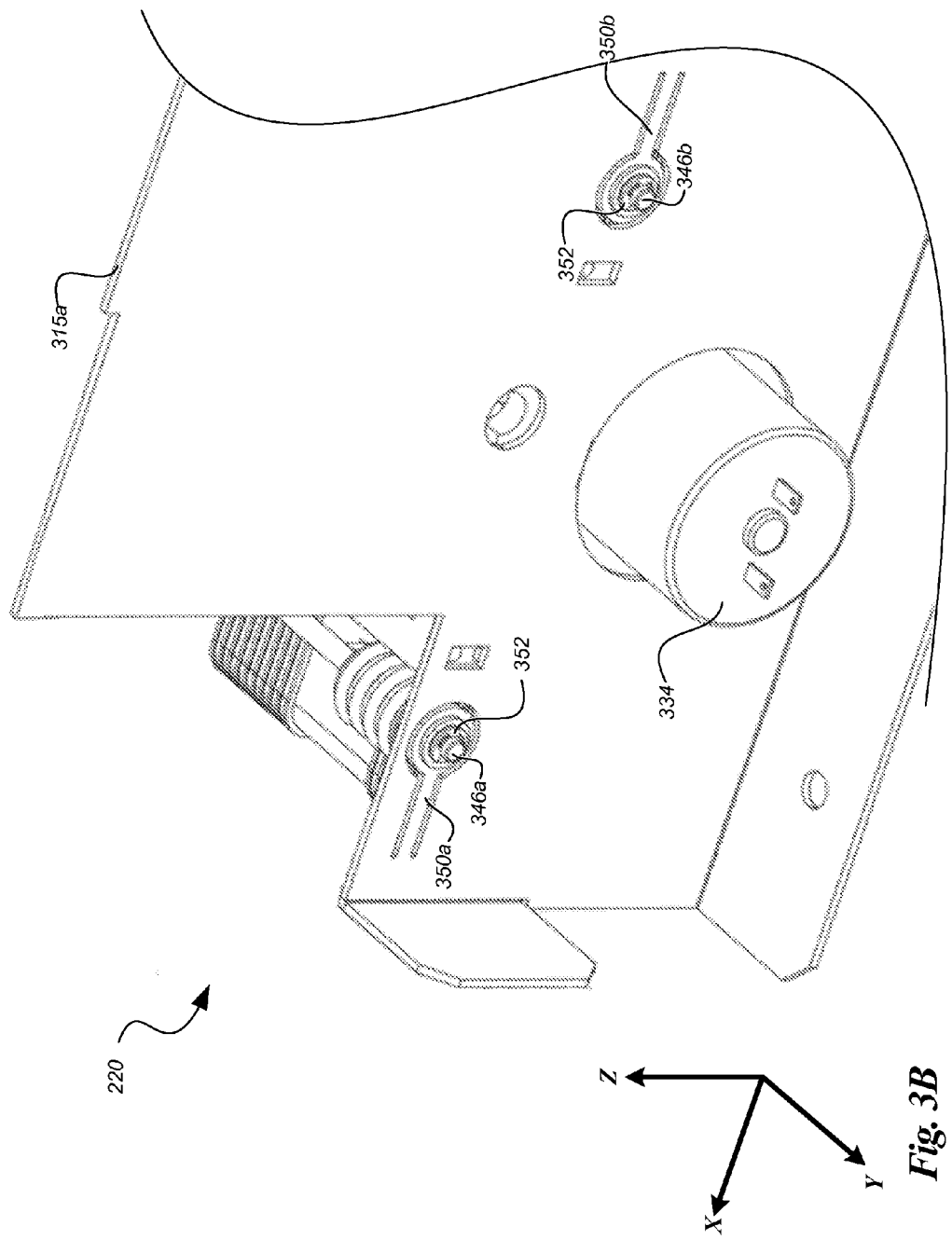
FIG. 3B is an enlarged partial, right-side isometric view of a multi-function card handling apparatus configured in accordance with an embodiment of the present technology.

FIG. 3A is a front, left-side isometric view of the card apparatus 220, and FIG. 3B is an enlarged partial, right-side isometric view of the card apparatus 220, configured in accordance with an embodiment of the present technology. Referring to FIGS. 3A and 3B together, in one aspect of this embodiment the card apparatus 220 includes the card port 222, a chassis 313, and a card transport assembly 330 carried by the chassis 313 at chassis walls 315 (identified individually as first and second chassis walls 315a and 315b). The card port 222 is mounted to the chassis 313. The card port 222 includes a card bezel 323 and a coin spacer element 324 (formed together as a single part), as well as a light emitting diode (LED) 325 and a card slot 326.

The card transport assembly 330 includes a card track 332 having a track surface 333, forward and rearward card detection sensors 335a and 335b (e.g., photoelectric sensors) extending through the card track 332, and a track strip 336 providing a card transport surface 337. In the illustrated embodiment, the card transport surface 337 includes ribs raised above the track surface 333 of the card track 332. In this regard, the track strip 336 can carry a card (not shown) such that it does not directly contact the track surface 333 or such that it only contacts a portion of the track surface 333 (i.e., only contacts a portion of the track surface 333 which is not covered by the track strip 336). In some embodiments, the card transport surface 337 spaces cards above the card track surface 333 to allow cards with embossed letters to remain flat (to facilitate, e.g., mag-stripe reading as well as other card handling). In one embodiment, the track strip 336 can be "Japanese glide tape" (e.g., part number APSGT) from Annapolis Performance Sailing of 104 Severn Avenue, Annapolis, Md., 21403. In other embodiments, the track strip 336 can be omitted and/or replaced with a surface treatment to mitigate card friction or "stiction" on at least a portion of the track surface 333.

As best seen in FIG. 3B, the card transport assembly further includes an X-axis motor 334 (e.g., a reversible 24VDC gear motor) which powers a drive assembly 338 (FIG. 3A). The drive assembly 338 includes a drive pulley 339 operably engaged with a serpentine drive belt 340 that is operably wrapped around two idler pulleys 342 and two drive pulleys 343 (identified individually as a first drive pulley 343a and a second drive pulley 343b). The first drive pulley 343a drives a first shaft 346a, to which a first intake roller 348a is operably coupled, and the second drive pulley 343b drives a second shaft 346b, to which a second intake roller 348b is operably coupled. In one aspect of this embodiment, compressible O-rings are wrapped around a circumference of the individual intake rollers 348 to facilitate gripping cards. In other embodiments, other configurations of compressible materials can cover the intake rollers 348 or the compressible materials can be omitted. As best seen in FIG. 3B, the first shaft 346a is supported at one end by a first biasing member 350a (e.g., a leaf spring), and the second shaft 346b is supported at one end by a second biasing member 350b (e.g., another leaf spring). The individual biasing members, for example, can be integrated into the first chassis wall 315a (e.g., by laser- or die-cutting a slot pattern), and the shafts 346 can include recessed grooves that engage with retaining clips or rings 352.

In operation, the controller 205 (FIG. 2) can signal to a user that it is ready for card intake by powering the LED 325, changing the output color of the LED 325 (e.g., from "red" to "green"), or by another suitable signal. The controller 205 can then await detection of an input card via the forward card detection sensor 335a. In one aspect of this embodiment, the coin spacer element 324 spaces the card slot 326 apart from the card track 332 to prevent a user from inadvertently inserting coins onto the card track 332. In some embodiments, a gap 327 in the coin spacer element 324 allows coins to fall towards the bottom of the kiosk 200 (FIG. 2) and into, e.g., a coin collection bin.

When the user inserts the card, the forward card detection sensor 335a can send a signal to the controller 205 that a card has been detected. Once the card is detected, the controller 205 can transmit a signal to the X-axis motor 334 to rotate the intake rollers 348 in a forward direction $d_1$. In the illustrated embodiment, the drive assembly 338 is configured to rotate the intake rollers 348 simultaneously. In another embodiment, however, the drive assembly 338 can be configured such that the intake rollers 348 rotate independently. Further, in other embodiments, the card transport assembly 330 can include additional intake rollers.

Once a card (not shown) is positioned beneath the first intake roller 348a, the first intake roller 348a contacts the card and pulls the card in the −X-axis direction away from the card port 222. In one aspect of this embodiment, the card pushes the first intake roller 348a upwardly, while the first biasing member 350a provides a downward force on the first shaft 346a that maintains contact between the card and the first intake roller 348a. In one embodiment, when a card is not positioned below the first intake roller 348a, the spacing between the card transport surface 337 and the first intake roller 348a is less than a thickness of a typical card (e.g., less than 0.030 inch).

Figure 4:
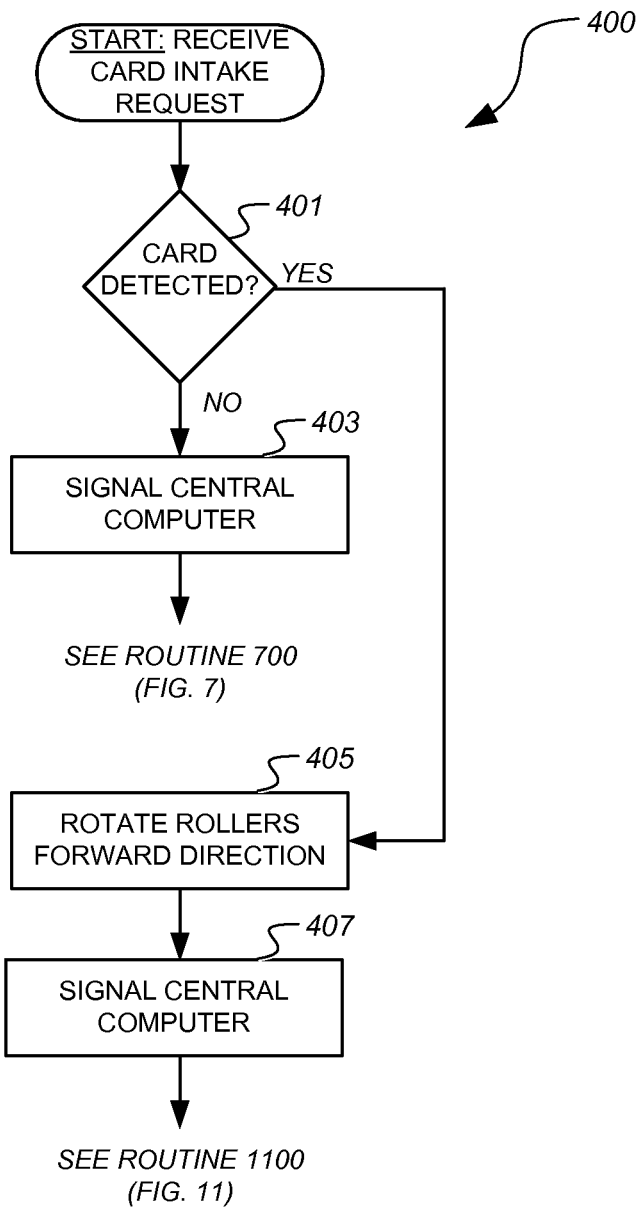
FIG. 4 is a flow diagram illustrating a routine for card intake with the multi-function card handling apparatus of FIGS. 3A and 3B in accordance with an embodiment of the present technology.

FIG. 4 is a flow diagram illustrating a card intake routine 400 that can be carried out by the card apparatus 220 (FIG. 2) to intake a card in accordance with an embodiment of the present technology. The card intake routine 400 starts when the controller 205 receives a request to intake the card, such as when a customer or other user wishes to submit a credit card to the kiosk 200. In response to the request, the card intake routine 400 proceeds to decision block 401 to determine whether a card has been inserted into the card apparatus 220. For example, as discussed above, the card intake routine 400 can employ the forward card detection sensor 335a to detect whether a card has been input into the card port 222. In one embodiment, the card intake routine 400 rotates the intake rollers 348 in the forward direction $d_1$ while awaiting detection (i.e., to facilitate card intake). In another embodiment, the card intake routine 400 rotates the intake rollers 348 at a later stage in the card intake routine 400 (i.e., after the card has been detected).

If card detection fails, the card intake routine 400 proceeds to block 403 to signal to the central computer 206 (FIG. 2) that a card has not been detected. Card detection may fail, for example, after a preset amount of time has elapsed from the initial intake request. If card detection is successful, however, the card intake routine 400 continues to block 405 to intake the input card by rotating (or continuing to rotate) the intake rollers 348 in the forward direction $d_1$. Once intake is complete, the card intake routine 400 proceeds to block 407 and transmits a corresponding signal to the central computer 206.

(ii) Card Read/Write

Figure 5:
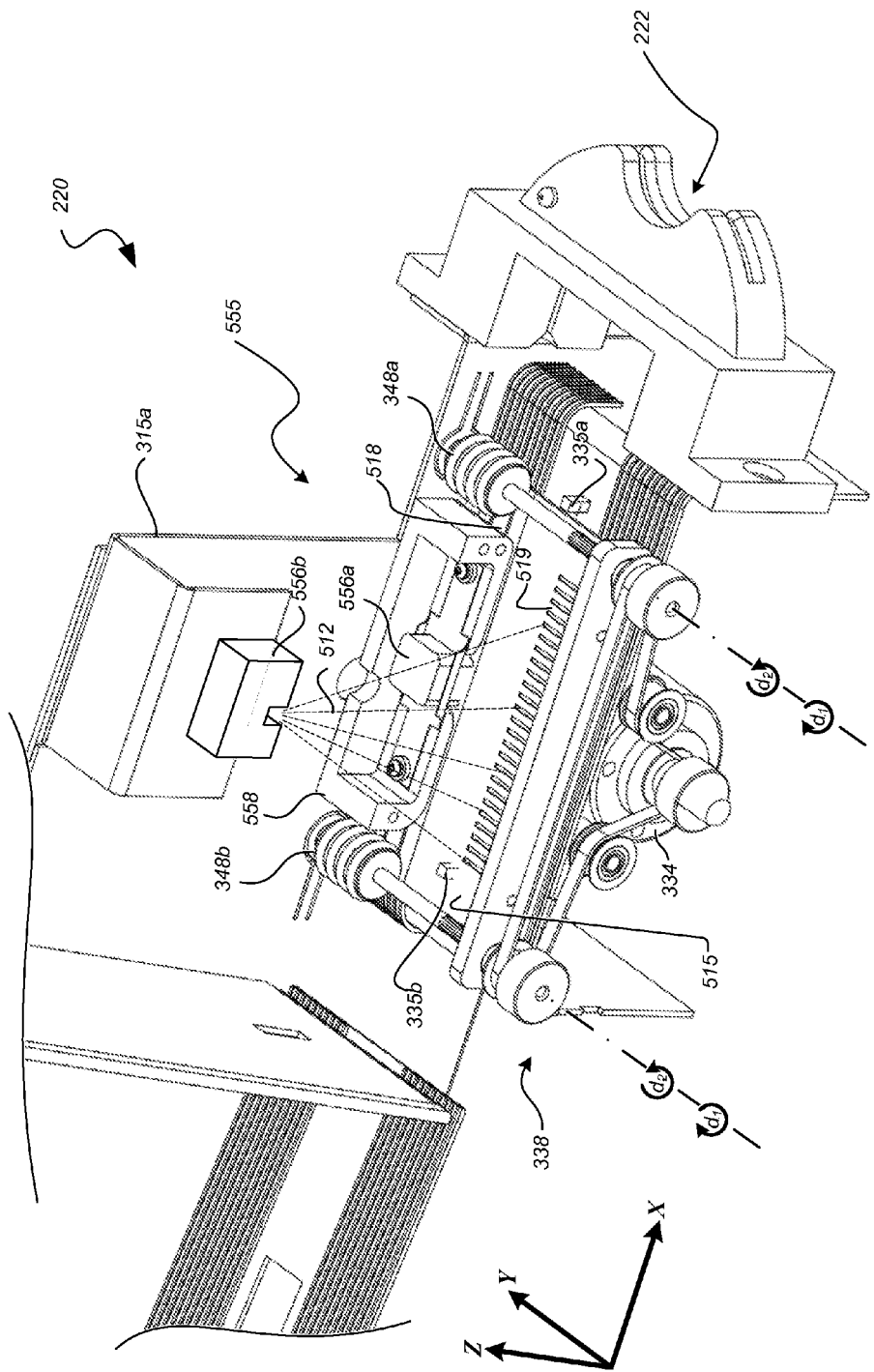
FIG. 5 is another partial, front isometric view of the multi-function card handling apparatus of FIGS. 3A and 3B configured in accordance with an embodiment of the present technology.

FIG. 5 is a partial, front isometric view of the card apparatus 220 configured in accordance with an embodiment of the present technology. For purposes of illustration, FIG. 5 shows the card apparatus 220 with a portion of the chassis 313 (FIG. 3A) removed. In one aspect of this embodiment, the card apparatus 220 includes a card read/write assembly 555 between the intake rollers 348 and mounted to the first chassis wall 315a. In the illustrated embodiment, the card read/write assembly 555 includes read devices 556 (identified individually as a read head 556a and an optical scanner 556b) and a card guide 558. The read head 556a and the card guide 558 can be spaced apart from the card track 332 to form a slight gap therebetween for a card 515 to pass through. The card 515 includes a magnetic stripe 518 and a bar code 519 that can be associated with, e.g., an account number, PIN, etc. In certain embodiments, the card 515 can include a memory chip, an RF ID, and/or other readable or writable features known in the art. In yet other embodiments, the magnetic stripe 518 and/or the bar code 519 can be omitted.

In one embodiment, read devices 556 can include an ISO ANSI and AAMVA compatible Magstripe Swipe Card Reader (e.g., part number 22045034) from MagTek, Inc. of 20725 South Annalee Avenue, Carson, Calif. 90746. Such a device can have a bi-directional read capability and can read up to one million passes with ISO-conforming cards. In other embodiments, the read devices 556 includes another type of suitable read device known in the art. In addition, the read devices 556 can include a card writer device (not shown) that is integrated into a read device (e.g., a combination read/write head) or a separate component. Further, in some embodiments, the card reader illustrated can include a single read device or more than two read devices.

In operation, the controller 205 (FIG. 2) rotates the intake rollers 348, via the X-axis motor 334 and the drive assembly 338, to transport the card 515 through the card guide 558 and under the read head 556a of the card read/write assembly 555. If the card guide 558 receives the card 515 from the X-axis direction (e.g., from the first intake roller 348a), the controller 205 rotates (or continues to rotate) the intake rollers 348 in the forward direction $d_1$ to pass the card 515 under the read head 556a to read the card (e.g., to read the magnetic stripe 518). As will be described in greater detail below, the card guide 558 can also receive cards from the −X-axis direction when the second intake roller 348b receives the card 515. When this happens, the controller 205 rotates the intake rollers 348 in the reverse direction $d_2$ to read the card 515.

As the intake rollers 348 rotate, a leading (or trailing) edge of the card 515 can pass over the forward and rearward card detection sensors 335a and 335b, which in turn transmit this information to the controller 205. The controller 205 can utilize this information to ascertain and control the position of the card 515 on the card track 332. For example, if the card 515 has not been properly read, the controller 205 can use the card position information to control the X-axis motor 334 (and the drive assembly 338) to move the card 515 back under the read head 556a for a second attempt to read the card 515. In some embodiments, the controller 205 is configured to also write to the card 515 via the card read/write assembly 555. In these embodiments, the controller 205 can operate the card read/write assembly 555 and the card transport assembly 330 in a manner similar to a card reading process.

In the illustrated embodiment, the controller 205 can also read bar codes and other machine readable indicia via a reader device, such as the optical scanner 556b which emits a scan beam 512 (shown in phantom) to detect a bar code pattern. In this embodiment, the controller 205 can operate the card reader assembly and the card transport assembly 330 in a manner similar to the card reading process described above. In another embodiment, the controller 205 can also stop rotation of the intake rollers 348 to hold the card 515 stationary during the card scan process.

Although described above with reference to the card 515, which has both the magnetic stripe 518 and the bar code 519, one skilled in the art will recognize that the controller 205 can operate the card read/write assembly 555 and the card transport assembly 330 to read a variety of card types. Such cards can lack a magnetic stripe and/or a bar code. Such cards can also include a different readable or writable feature (e.g., a quick response (QR) code, RF ID tag, or a holographic image) in addition to or in lieu of a magnetic stripe or a bar code. In such embodiments, the read head 556a and/or the optical scanner 556b can be omitted from the card read/write assembly 555 and/or other read devices can be incorporated in the card read/write assembly 555.

In some embodiments, the central computer 206 (FIG. 2) can receive the information read from the magnetic stripe 518 as well as the information read from the bar code 519. The central computer 206 can be configured to process both types of information, or the system computer can elect to process only one type of information. Further, the central computer 206 can signal to the controller 205 to only read magnetic stripes or to only read bar codes, or the central computer 206 can prioritize read order. For example, if the controller 205 detects that a card does not have a magnetic stripe (or the stripe cannot be read), the central computer 206 can signal to the controller 205 to attempt a read with the optical scanner 556b.

Figure 6:
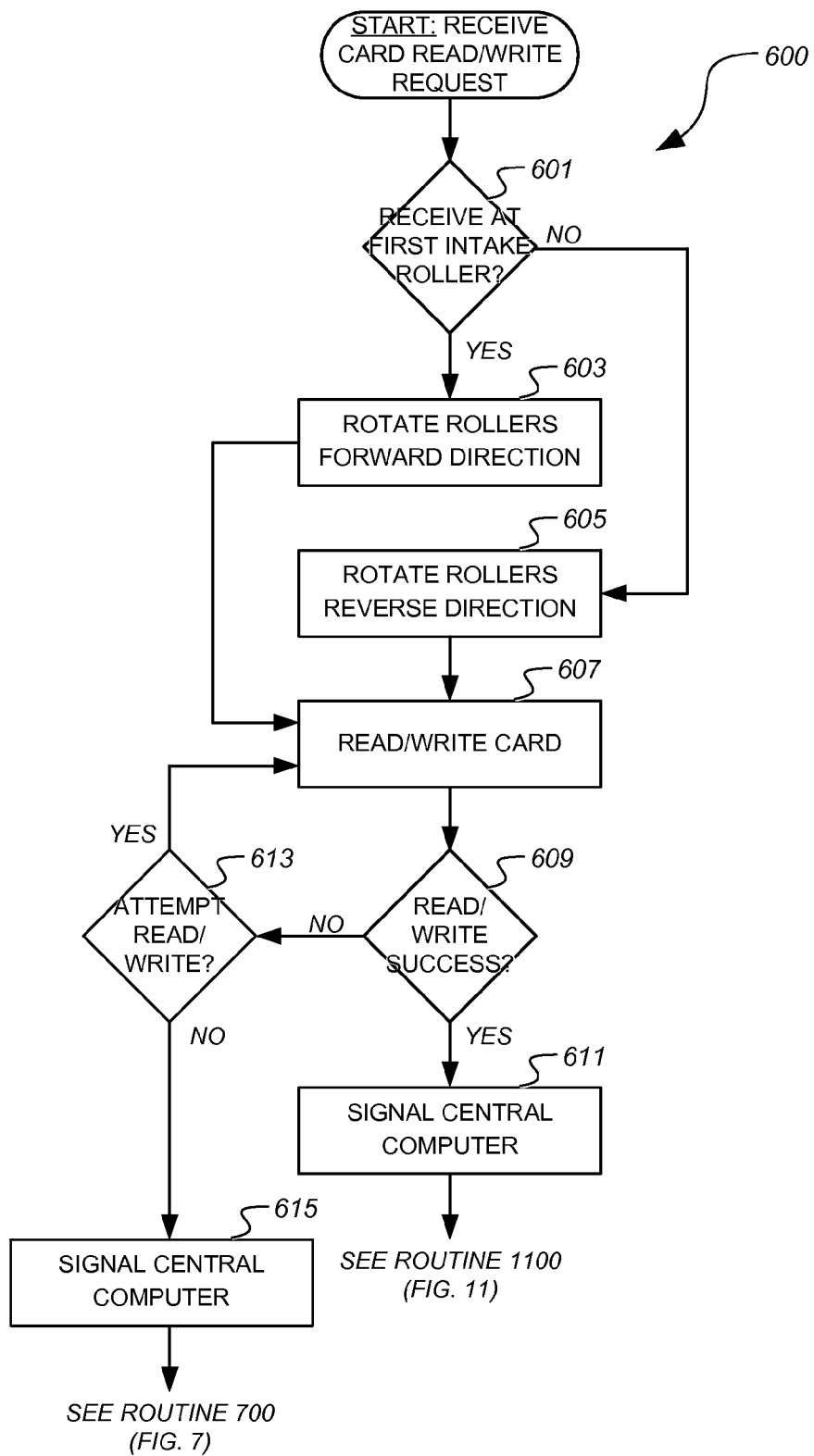
FIG. 6 is a flow diagram illustrating a routine for card read/write with the multi-function card handling apparatus of FIGS. 3A and 3B in accordance with an embodiment of the present technology.

FIG. 6 is a flow diagram illustrating a card read/write routine 600 that can be carried out by the card apparatus 220 (FIG. 2) to read from and/or write to a card (if applicable) in accordance with an embodiment of the present technology. The card read/write routine 600 starts when the controller 205 receives a request to read from or write to a card. In response to the request, the card read/write routine 600 proceeds to decision block 601 to determine whether the card is to be received from the first intake roller 348a (i.e., from the card port 222). If so, the card read/write routine 600 proceeds to block 603 to rotate the intake rollers 348 in the forward direction $d_1$ shown in FIG. 5. If the card is to be received from the second intake roller 348b (i.e., from a card hopper; described below), the card read/write routine 600 proceeds to block 605 to rotate the intake rollers 348 in the reverse direction $d_2$ shown in FIG. 5.

In block 607, the card read/write routine 600 proceeds to attempt to read from/write to the card (e.g., via the read head 556a and/or the optical scanner 556b), and then it continues on to decision block 609 to determine if the card was sufficiently read/written. If the card was successfully read/written, the second routine proceeds to block 611 to signal the central computer 206 that the card has been read/written. In such a case, the central computer 206 can initiate another routine, such as to dispense the card to the user at the card port (see, e.g., routine 800 of FIG. 8). If the card read/write was not successful, however, the card read/write routine 600 proceeds to decision block 613 to determine whether card is to be re-read or re-written. If the card is to be re-read or re-written, the card read/write routine 600 returns to block 607, or else the card read/write routine 600 proceeds to block 615 to send a read/write fail signal to the central computer 206. In one embodiment, during re-read the controller 205 can switch to a different read device, such as from the read head 556a to the optical scanner 556b (or vice-versa). For example, an input card may include the bar code 519 but not the magnetic stripe 518 (or vice versa).

(iii) Card Dispense

Figure 7A:
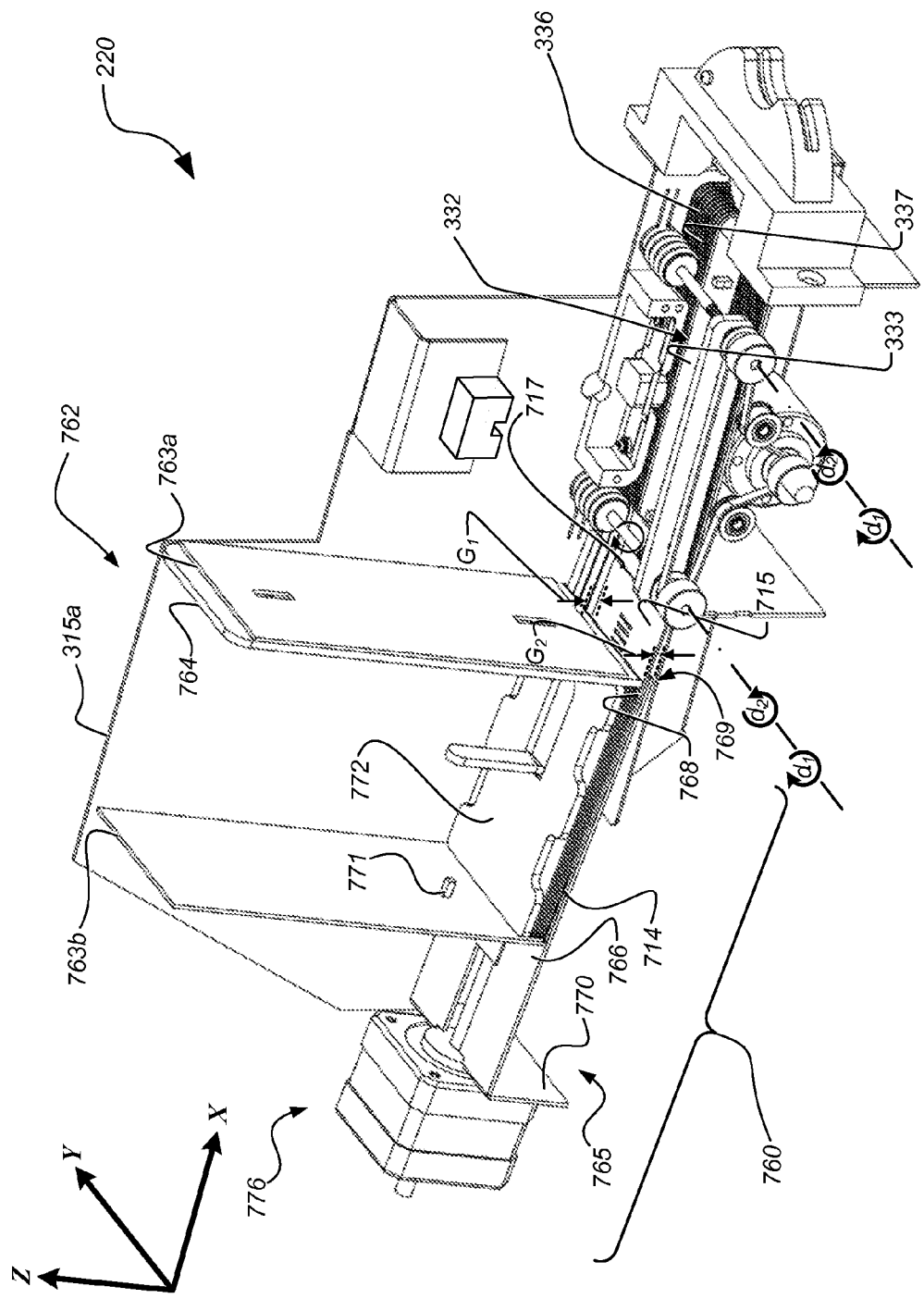
FIG. 7A is a further front isometric view of the multi-function card handling apparatus of FIGS. 3A and 3B.
Figure 7B:
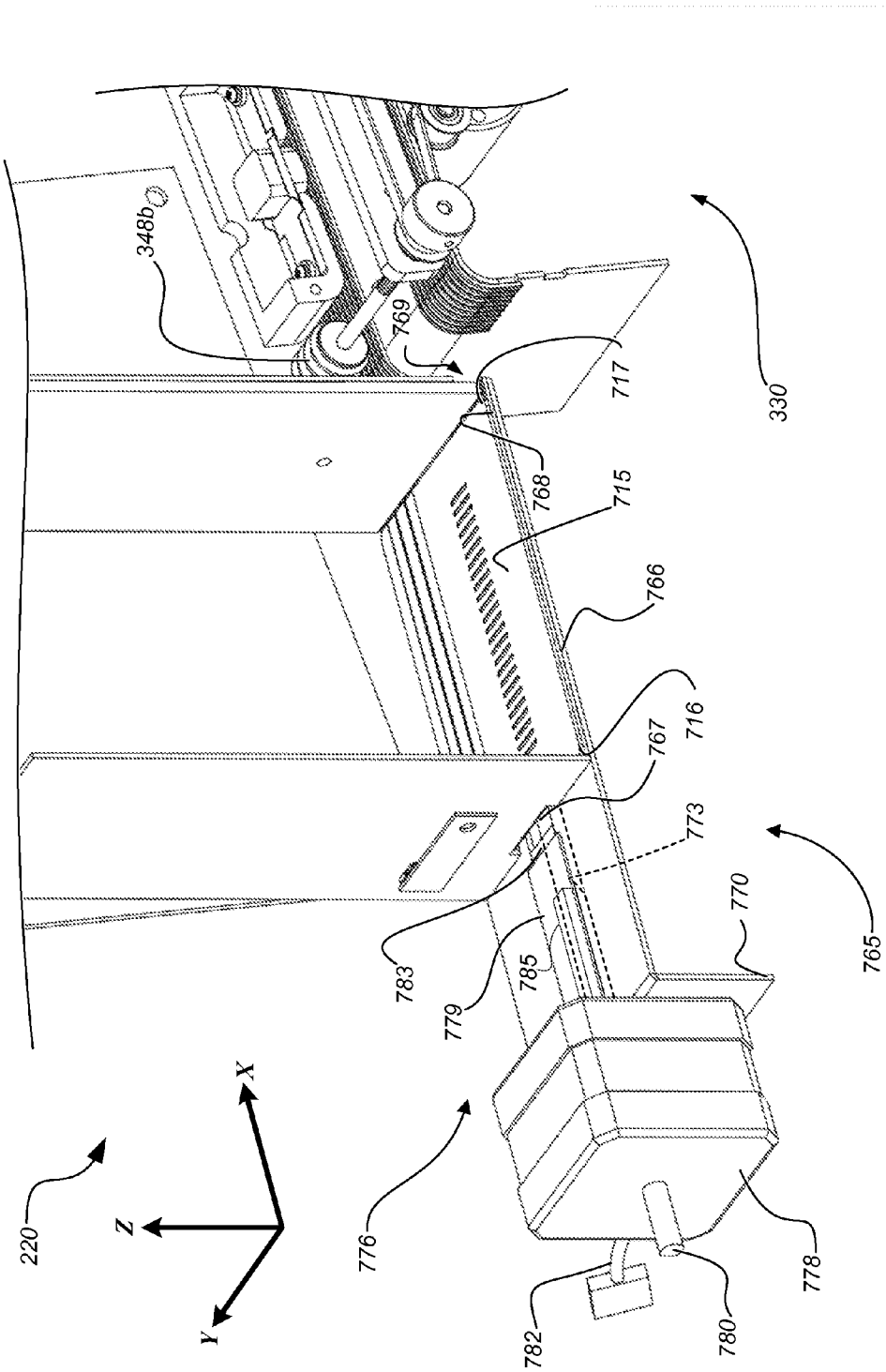
FIG. 7B is a partial, rear isometric view of the multi-function card apparatus.
Figure 7C:
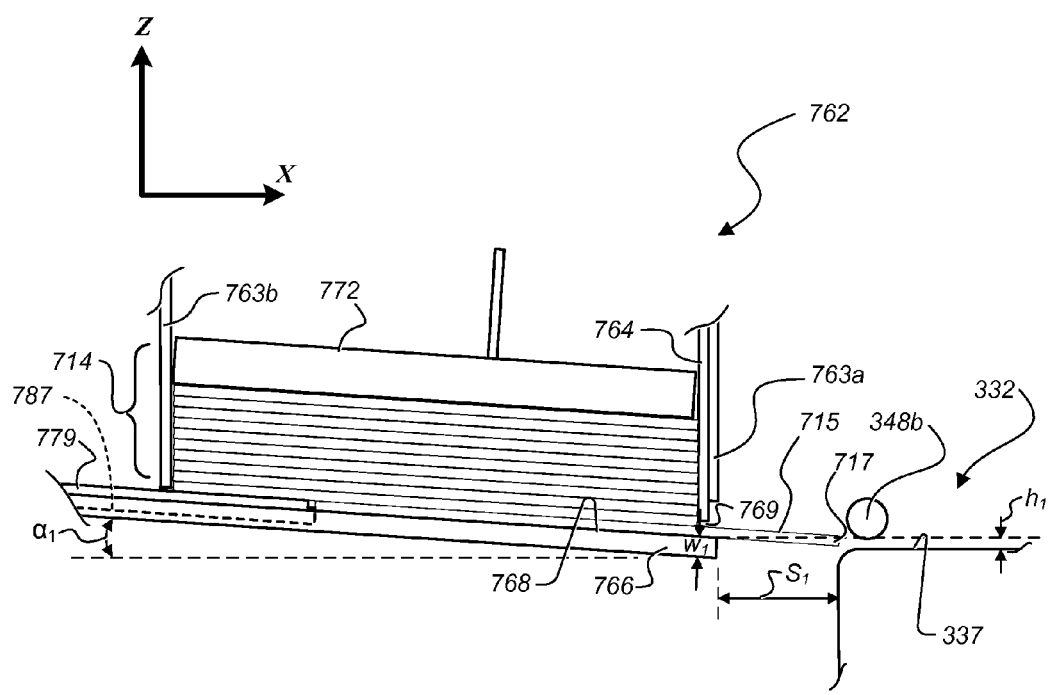
FIG. 7C is a partial, schematic illustration of the multi-function card apparatus configured in accordance with an embodiment of the present technology.

FIG. 7A is a front isometric view of the card apparatus 220, FIG. 7B is a partial, rear isometric view of the card apparatus 220, and FIG. 7C is a partial, schematic illustration of the card apparatus 220 configured in accordance with an embodiment of the present technology. Referring first to FIG. 7A, in one aspect of this embodiment, the card apparatus 220 includes a card hopper assembly 760 having a card hopper 762 and a card ejector 776. The card hopper 762 includes sidewalls 763 (identified individually as a first sidewall 763a and a second sidewall 763b), a retaining plate 764, and a base member 765. A card weight 772 holds a stack of cards 714 within the chassis walls 315 and the sidewalls 763. The first sidewall 763a is attached to the chassis walls 315 (only the first chassis wall 315a is shown in FIG. 7A) above a bottom wall 766 of the base member 765 to define a first gap $G_1$. The retaining plate 764 is slidably coupled to the first sidewall 763a and locked into place, for example, with set screws (not visible in the Figures). A card exit 769, having a second gap $G_2$, includes a portion of the first gap $G_1$ not covered by the retaining plate 764. In one embodiment, the second gap $G_2$ of the card exit 769 is greater than about 0.030 inch (e.g., the typical thickness of a single wallet-sized card), but less than about 0.060 inch (e.g., 0.045 inch). In other embodiments, the second gap $G_2$ of the card exit 769 can have other values.

As described in greater detail below, the bottom wall 766 includes a card eject surface 768 that is spaced apart from the card track 332 to form a gap therebetween. Also, the card eject surface 768 is elevated above a rearward portion of the card transport surface 337 of the track strip 336 (as well as the track surface 333) in the Z-axis direction and canted downwardly towards the card transport surface 337.

In some embodiments, one or more sensors (e.g., photoelectric sensors) can be mounted on at least one the sidewalls 763 and/or the chassis walls 315. For example, in the illustrated embodiment, a height sensor 771 is mounted inside the card hopper 762 at the second sidewall 763b to detect, for example, a remaining number of cards in the card hopper 762 and/or whether the card hopper 762 is empty.

FIG. 7B shows the card ejector 776 of the card hopper assembly 760 in more detail. The card ejector 776 includes a rotator 778 (e.g., a rotary solenoid), a card ejector plate 779, and a shaft 780 operatively coupled to the rotator 778. The rotator 778 is attached to the rear plate 770 of the base member 765 and electrically connected to the controller 205 (FIG. 2) via a quick disconnect cable connector 782. The card ejector plate 779 is slidably engaged with a transverse slot 773 in the bottom wall 866. The card ejector plate 779 includes a forward abutment feature or lip 783 configured to contact a rear edge portion 716 of a card 715 through a slot 767 of the second sidewall 763b of the card hopper 762. The shaft 780 extends through the rotator 778 towards the X-axis. At one end, the shaft 780 is operatively engaged with the rotator 778 within the housing of the rotator. At another end, the shaft 780 is received in a cavity 785 (shown schematically) of the card ejector plate 779. In one embodiment, the shaft 780 includes screw threads (not shown) that mate with receiving threads (also not shown) in the cavity 785.

In operation, the controller 205 (FIG. 2) initiates card ejection by transmitting a signal to the rotator 778 via the connector 782. In response to the control signal, the rotator 778 rotates the shaft 780 in a first direction (e.g., a counterclockwise direction). As the shaft 780 rotates in the first direction, the threads of the shaft 780 engage with the threads of the card ejector plate 779 to drive the card ejector plate 779 forward towards the +X-axis direction. This in in turn causes the lip 783 of the card ejector plate 779 to drive the card 715 out of the card hopper 762 through the card exit 769. In one embodiment, the controller 205 regulates rotation of the rotator 778 to limit the force exerted by the leading edge 717 of the card 715 at the second intake roller 348b of the card transport assembly 330. Excessive force, for example, can potentially damage the second intake roller 348b (e.g., by slicing plastic, rubber, or other materials off the intake roller).

Referring back to FIG. 7B, while the card ejector plate 779 ejects the selected card 815, the card weight 772 presses the card 715 towards the bottom wall 766 of the base member 765 to ensure sufficient card clearance through the card exit 769. At the same time, the retaining plate 764 holds the remaining cards of the card stack within the card hopper 762.

Referring to FIG. 7C, during ejection, the card ejector plate 779 directs the leading edge 717 of the bottom-most card 715 from the card eject surface 768 toward the card transport surface 337 at the track strip 336 (FIG. 3A). Once the leading edge 717 extends a sufficient distance outside of the card exit 769, the second intake roller 348b receives the leading edge 717 and drives the card onto the card track 332. In the illustrated embodiment, the card weight 772 firmly holds the selected card 715. A spacing distance $S_1$ (i.e., a gap) can be selected such that card weight 772 holds the center of mass of the card 715 above the card eject surface 768 until the leading edge 717 of the card 715 makes contact with at least one of the card transport surface 337 or the second intake roller 348b. In other embodiments, the spacing distance $S_1$ can be selected such the leading edge 717 of the card 715 eventually "falls" towards the card transport surface 337 (i.e., due to the center of mass of the card 715).

An angle $\alpha_1$ of the card hopper (with respect to the X-Z axis) can be based on, for example, a height $h_1$ of the card hopper 762 above the card track surface 333. For example, if the spacing distance $S_1$ is 1.5 inches (e.g., less than half the length of a typical card) and the height $h_1$ is 0.135 inch, then angle $\alpha_1$ can be about 5 degrees (i.e., arctangent of (0.135 inch divided by 1.5 inches)). In one aspect of this embodiment described in greater detail below, the height $h_1$ and/or a width $w_1$ of the bottom wall 766 can be selected to ensure sufficient card clearance under the card hopper 762 during a card deposit routine (FIG. 10).

After the card 715 is successfully ejected, the card weight 772 presses the next card in the stack of cards 714 directly against the bottom wall 766 to position the next card for card ejection. In some embodiments, the controller 205 can detect the remaining number of cards in the stack of cards 714 via the height sensor 771 (FIG. 7A) and transmit a corresponding signal to the central computer 206 (FIG. 2) when the card hopper 762 is empty or approaching empty.

Referring back to FIG. 7B, in response to another control signal, the rotator 778 rotates the shaft 780 in a second direction (e.g., a clockwise direction) to pull the card ejector plate 779 back in the −X-direction to reposition the card ejector plate 779 in the home position. In one embodiment, the rotator 778 can include one or more limit switches (not shown) for detecting whether the card ejector plate 779 is in the home position. Alternatively, the rotator 778 can include an encoder (also not shown) for detecting this positioning.

Figure 8:
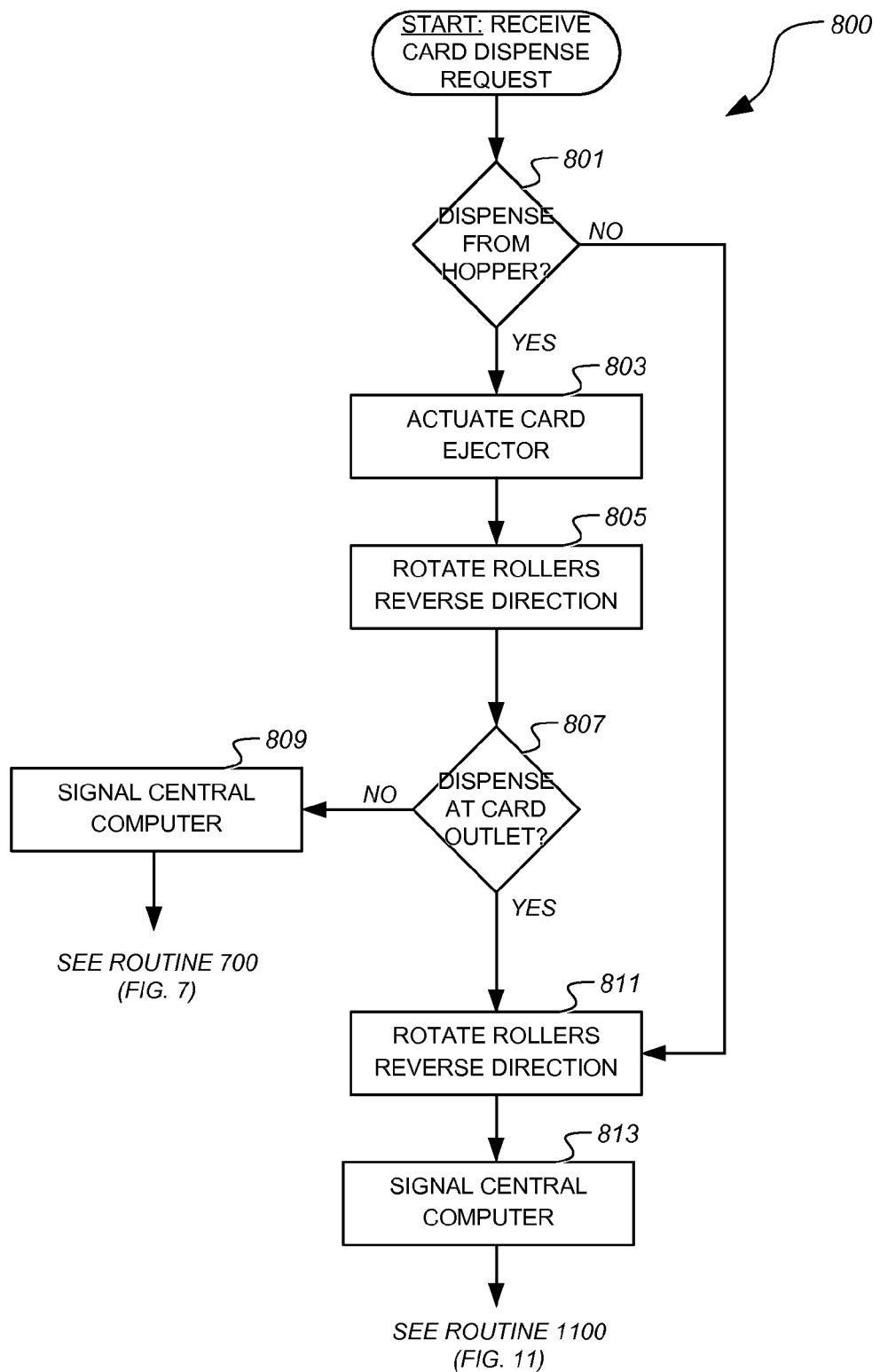
FIG. 8 is a flow diagram illustrating a routine for card dispensing with the multi-function card handling apparatus of FIGS. 3A and 3B in accordance with an embodiment of the present technology.

FIG. 8 is a flow diagram illustrating a card dispense routine 800 that can be carried out by the card apparatus 220 (FIG. 2) in accordance with an embodiment of the present technology. In one aspect of this embodiment, this routine card includes moving a card from the card track 332 to the card port 222. This can occur, for example, after card read/write as described above. In another aspect of this embodiment, card dispense includes moving a card from the card hopper assembly 330 to the card track 332. The can occur, for example, before card/ read write as described above.

The card dispense routine 800 starts when the controller 205 (FIG. 2) receives a request to dispense a card. In response to the request, the card dispense routine 800 proceeds to decision block 801 to determine whether the card is to be dispensed from the card hopper 762. If so, the card dispense routine 800 proceeds to block 803. If, however, the card is to be dispensed to the card port (i.e., if the card is already on the card track 332), the card dispense routine 800 proceeds to block 809.

At block 803, the card dispense routine 800 proceeds to eject the selected card from the card hopper 762 by actuating the rotator 778 of the card ejector 776. In one embodiment, the card dispense routine 800 can initiate rotation of the intake rollers 348 in the reverse direction $d_2$ to facilitate card intake unto the card track 332 from the card hopper 762. In another embodiment, the card dispense routine 800 can initiate rotation at a later stage, such as at block 805.

At block 805, the card dispense routine 800 rotates the intake rollers 348 in the reverse direction $d_2$ (by, e.g., by continuing rotation after block 803 or initiating rotation). As they rotate, the intake rollers 348 transport the card in the X-axis direction onto the card track 332 and onward toward the card read/write assembly 555. The card dispense routine next proceeds to block 807 to determine whether the card transport is to be transported directly to the card port 222 (e.g., without first carrying out card read/write). If the card is to be held momentarily on the card track and not immediately output to the card port, the card dispense routine 800 proceeds to block 807 to signal the central computer that the card has been dispensed onto the card track. The card dispense routine 800 can at this time cease rotation of the intake rollers 348 or slow down the speed of rotation. For example, the card dispense routine 800 can cease rotation once the card is detected at the forward card detection sensor 335*a*. If, however, the card is to continue directly to the card port 222, the card dispense routine 800 proceeds to block 811.

If the card is to be dispensed at the card port, the card dispense routine 800 continues to block 811. At block 811, the card dispense routine 800 rotates the intake rollers 348 in the reverse direction $d_2$ to transport the card towards the card port 222 to dispense the card. If the card has been properly dispensed, the card dispense routine 800 proceeds to block 813 and transmits a corresponding signals to the central computer 206.

In one embodiment, the card dispense routine 800 can rotate the intake rollers 348 a predetermined number of revolutions to ensure that the card has been properly dispensed (e.g., via a decoder at the X-axis motor 334). In some embodiments, the card dispense routine 800 can detect card removal with the forward card detection sensor 335*a*. In these embodiments, the card dispense routine 800 can retract the card back into the card apparatus 220 if, for example, a user fails to remove the card after a preselected amount of time.

(iv) Card Deposit

FIG. 9 is a partial, front-side isometric view of the card apparatus 220 configured in accordance with an embodiment of the present technology. In operation, the controller 205 rotates the intake rollers 348 via the X-axis motor 334 and the drive assembly 338, in the forward direction $d_1$ to transport the card toward the card collection region 210 underneath the card hopper 762. As discussed above, the height $h_1$ of the card eject surface and the width $w_1$ of the bottom wall 766 of the card hopper 762 are selected to such that the card 915 has adequate clearance (FIG. 8).

During card deposit, the intake rollers 348 continue to rotate in the direction of $d_1$ until the second intake roller 348*b* releases the card 915 from the card track 332. This release can occur, for example, when the second intake roller 348*b* no longer contacts the card 915, or until at least the second intake roller 348*b* can no longer hold the card 915 on the card track 332. Once the second intake roller 348*b* releases the card 915, the card 915 falls in the −Z-axis direction towards the card collection region 210 positioned beneath the card hopper 762. In one embodiment, the card 915 falls into the card collection bin 212 (FIG. 2).

FIG. 10 is a flow diagram illustrating a card deposit routine 1000 that can be carried out by the card apparatus 220 (FIG. 2) to deposit a card (e.g., to deposit a card receive from a user a user via the card port 222) in accordance with an embodiment of the present technology. The card deposit routine 1000 starts when the controller 205 (FIG. 2) receives a request for card deposit. In response to the request, in block 1001 the card deposit routine 1000 proceeds to rotate the intake rollers 348 in the forward direction $d_1$. Once the card has been deposited, the card deposit routine 1000 can signal to the central computer that the card has been deposited, as shown at block 1003.

In one embodiment, the card deposit routine 1000 can rotate the intake rollers 348 a predetermined number of revolutions to ensure that the card has been properly dispensed (e.g., via a decoder at the X-axis motor 334). In some embodiments, the card deposit routine 1000 can detect card removal with one or more sensors that detects that the card has been deposited. (e.g., a sensor in the card collection region 210; not shown)

System Routine

Figure 11:
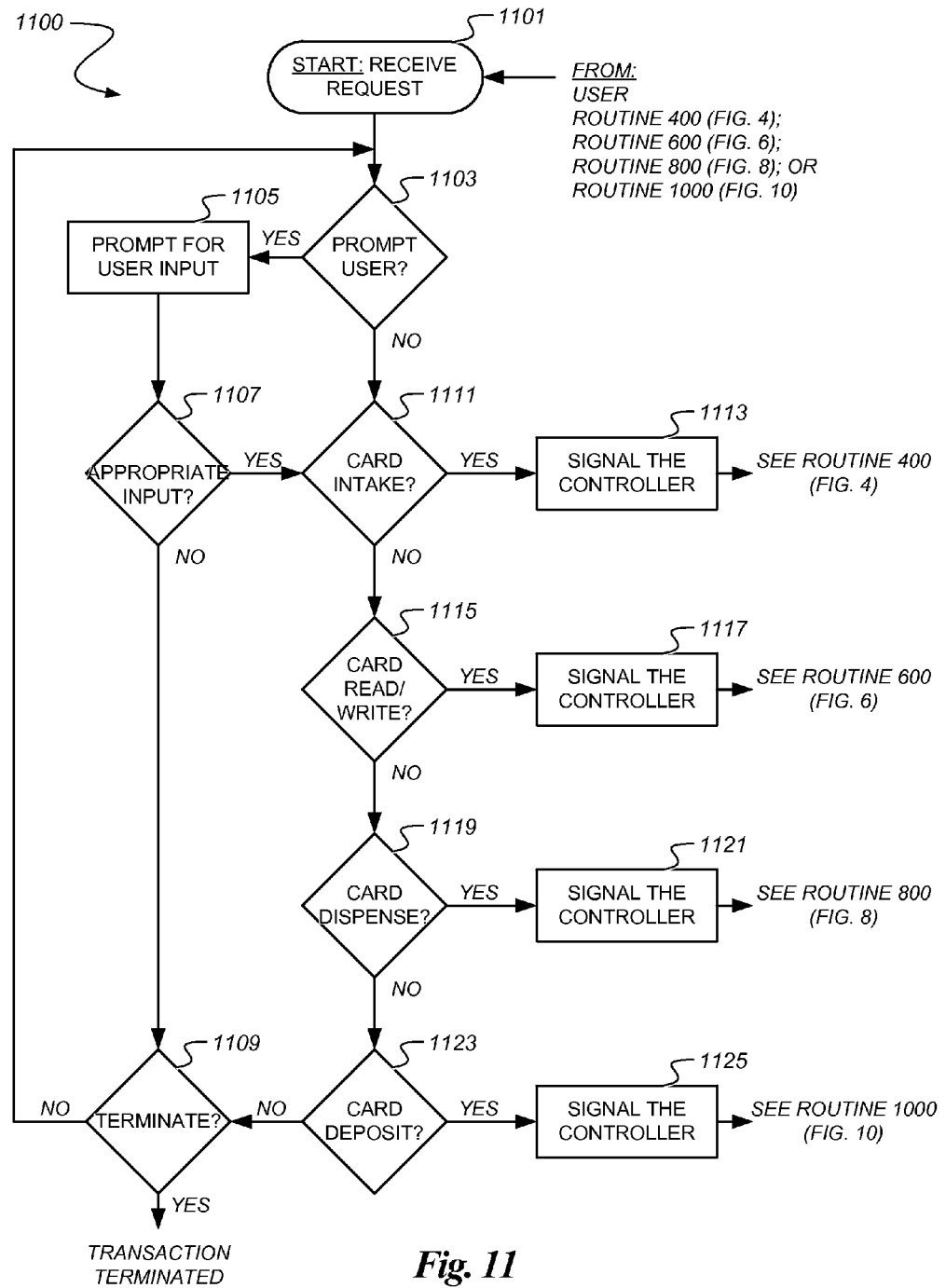
FIG. 11 is a flow diagram illustrating another routine for operating the multi-function card handling apparatus of FIGS. 3A and 3B in accordance with an embodiment of the present technology.

FIG. 11 is a flow diagram that illustrates a routine 1100 for operating a kiosk, such as the kiosk 200 (FIG. 2), or other suitable machines for dispensing/receiving, or otherwise handling cards. As described in greater detail below, the routine 1100 can transmit a signal to (and receive signals from) the card apparatus 220 (FIG. 2). In the illustrated embodiment, the routine 1100 can make calls to the controller 205 (FIG. 2) to execute the above-described routines 400, 600, 800, and 1000 in various sequences. In one aspect of this embodiment, the routine 1100 is carried out by the central computer 206 according to computer-executable instructions stored on a computer-readable medium, such as a floppy disk, CD-ROM, integrated circuit chip, etc. As those of ordinary skill in the art will appreciate, however, the routines 400, 600, 800, 1000, and 1100 can be carried out partially or solely by one or more controllers, one or more computers, and/or combinations thereof. Further, the various routines of the present technology can be consolidated in various ways. For example, the routine 1100 can initiate a routine that consolidates various aspects of the above-described card intake routine 400 (FIG. 4) and the card read/write routine 600 (FIG. 6). In addition, as shown in the illustrated embodiment, the routine 1100 can cycle through selected blocks of the routine 1100 a single time or multiple times depending on the outcomes of the various decision blocks of FIG. 11. For example, during a first cycle, the routine 1100 can proceed to block 1105 to prompt a user for input, while in a later cycle, the routine 1100 can proceed to block 1121 to initiate the card dispense routine 800 (FIG. 8).

The routine 1100 starts when the central computer 206 receives a request in start block 1101. In one aspect of this embodiment, the request is a user-request from a user via, e.g., the user interface 209 (FIG. 2). As described above, the user interface 209 can communicate with a keypad, touch screen, and/or other user selection buttons. In another aspect of this embodiment, the request in start block 1101 is from the controller 205 (FIG. 2). For example, the controller 205 can initiate a request in start block 1101 upon completion of one of the above-described routines 400, 600, 800, and/or 1000.

In response to the request in start block 1101, the routine 1100 determines in decision block 1103 whether to prompt the user for input. If the routine 1100 decides not to prompt the user, the routine 1100 proceeds to block 1111. The routine 1100 may elect not to prompt the user, for example, when the controller 205 (rather than the user) has initiated a request. If a user is to be prompted, however, the routine 1100 proceeds to block 1105. In one aspect of this embodiment, the routine 1100 can prompt the user to enter a payment, insert a card into the kiosk, and/or request a card to be dispensed from the kiosk (e.g., a card that a vendor has pre-loaded into the card hopper 762; FIG. 7A). In another aspect of this embodiment, the routine 1100 can prompt the user to manually enter information, such as to press a button or a touch screen to confirm that a transaction is complete.

At decision block 1107, the routine 1100 determines whether it has received appropriate user input. Appropriate user input can include, for example, payment in the form of coins, bills, credit, debit, deduction from gift card, redemption of a voucher, or prepayment from a remote computer (via, e.g., a computer network or an associated web site). Appropriate user input can also include requests involves dispensing and/or depositing cards, such gift cards, calling cards, etc. For example, user input can include a user's request to dispense a card from the kiosk (e.g., a request to receive a gift card) and/or a user's request to surrender a card to the kiosk (e.g., a card that no longer has any value). As described above, appropriate user input can also include a request to exchange a card for cash, credit, in-store credit, or another card (e.g., a card that a vendor has loaded into the card hopper 762; FIG. 7A). Various embodiments of card exchanges methods are described, for example, in U.S. Publication No. 2012/0109787, which is herein incorporated in its entirety.

In other embodiments, appropriate user input does not require a request for payment or exchange. For example, appropriate user input can include a request for a merchant's club card, which can include a card that gives the user in-store discounts and/or give the merchant the ability to track the user's purchasing preferences or behavior. In one embodiment, a user only needs to enter an address, a driver's license number, etc. to receive the club card.

If appropriate input is not received in decision block 1107, the routine 1100 proceeds to decision block 1109 to determine if a transaction is to be terminated. In one embodiment, the routine 1100 can elect to terminate the transaction based on an amount of time that elapses after prompting the user in block 1105. In other embodiments, termination can be based on other factors, including lack of a user response to an appropriate prompt or user termination input. If, however, the routine 1100 determines that the transaction should not be terminated, the routine 1100 returns to decision block 1103 to prompt the user.

If appropriate input is received in decision block 1107, the routine 1100 proceeds to decision block 1111 to determine whether the card apparatus 220 is to intake a card. If the card apparatus 220 is to intake the card, the routine 1100 proceeds to block 1113 to signal the controller 205 to intake the card via the card intake routine 400 (FIG. 4). However, if no card intake is to occur at this time, the routine 1100 continues to decision block 1115.

In decision block 1115, the routine 1100 determines whether a card is to be read/written. If the card is to be read/written, the routine 1100 proceeds to block 1117 to signal the controller 205 to read/write via the card read/write routine 600 (FIG. 6). As discussed above, in some embodiments the card read/write assembly 555 (FIG. 5) is only configured for card reading. Accordingly, in these embodiments the routine 1100 would not make a determination about whether the card is to be written. Similarly, the card read/write routine 600 (FIG. 6) would not involve card writing in these embodiments.

If, however, the card is not to be read/written at this time, the routine proceeds to block 1119 to determine whether a card is to be dispensed by the card apparatus 220. If a card is to be dispensed, the routine 1100 proceeds to block 1121 to signal the controller 205 to dispense a card via the card dispense routine 800 (FIG. 8). As discussed above, the card dispense routine 800 can include dispensing a card to the card port 222 (e.g., after it has been read/written) and/or from the card hopper 762 (e.g., before it has been read/written). If, however, a card is not to be dispensed the routine 1100 continues to decision block 1123

At decision block 1123, the routine 1100 determines whether a card is to be deposited for card collection. If the card is to be deposited, the routine 1100 proceeds to block 1125 to signal the controller 205 to deposit a card. The deposited card can be stored, for example, at the card collection bin 212 (FIG. 2) and be removed from the kiosk at a later time by kiosk service personal. If the card is not to be deposited, the routine 1100 continues to decision block 1109. As discussed, in decision block 1109 the routine 1100 can determine to terminate the transaction or return to determine whether to prompt the user (block 1103).

The foregoing description of embodiments of the invention is not intended to be exhaustive or to limit the invention to the precise embodiments disclosed. While specific embodiments of, and examples for, the invention are described herein for illustrative purposes, various equivalent modifications are possible within the scope of the invention, as those of ordinary skill in the relevant art will recognize. For example, although certain functions may be described in the disclosure in a particular order, in alternate embodiments these functions can be performed in a different order or substantially concurrently, without departing from the spirit or scope of the present technology. In addition, the teachings of the present technology can be applied to other systems, not only the representative card vending systems described herein. Further, various aspects of the invention described herein can be combined to provide yet other embodiments.

All of the patent and patent applications references cited herein are incorporated in their entireties by reference. Accordingly, aspects of the invention can be modified, if necessary or desirable, to employ the systems, functions, and concepts of the cited references to provide yet further embodiments of the invention. These and other changes can be made to the invention in light of the above-detailed description. In general, the terms used in the following claims should not be construed to limit the invention to the specific embodiments disclosed in the specification, unless the above-detailed description explicitly defines such terms. Accordingly, the actual scope of the invention encompasses the disclosed embodiments and all equivalent ways of practicing or implementing the invention under the claims.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

I claim:

1. A card handling apparatus configured to receive and dispense cards from a card port, the card handling apparatus comprising:
   a card hopper including a side wall and a bottom wall configured to at least partially define a card exit slot, wherein the bottom wall includes a card eject surface, and wherein the card hopper is configured to hold a first card adjacent the card exit slot and at least a second card on top of the first card;
   a card track positioned adjacent to the card hopper, wherein the card track includes a card transport surface positioned below the card eject surface;
   a card ejector configured to drive the first card through the card exit slot and onto the card transport surface; and
   at least a first roller positioned adjacent to the card transport surface, wherein the roller is configured to rotate in a first direction to move the first card away from the card hopper and toward the card port, and wherein the roller is further configured to rotate in a second direction to receive a third card from the card port and move the third card toward the card hopper,
   wherein the card eject surface is canted towards the card transport surface of the card track.

2. The card handling apparatus of claim 1 further comprising a card collection bin positioned below the card hopper, wherein the card transport surface is spaced apart from the card hopper to define a gap therebetween, and wherein the roller is further configured to rotate in the second direction and move the third card through the gap and into the card collection bin.

3. The card handling apparatus of claim 1 further comprising a card collection bin positioned below the card hopper, wherein the card transport surface is offset from the card eject surface in a first direction and from the card hopper in a second direction, perpendicular to the first direction, to define a gap therebetween, and wherein the roller is further configured to rotate in the second direction and move the third card through the gap and into the card collection bin.

4. The card handling apparatus of claim 1, further comprising a card collection bin positioned below the card hopper, wherein the roller is further configured to rotate in the second direction and move the third card into the card collection bin.

5. The card handling apparatus of claim 1 wherein the apparatus further comprises a second roller configured to rotate in the first direction to move the first card away from the card hopper and in the second direction to move the third card away from the card port.

6. The card handling apparatus of claim 1 wherein the first card has a thickness, and wherein the roller and the card transport surface are spaced apart by a distance that is less than the thickness of the first card.

7. The apparatus of claim 1, further comprising a coin spacer element configured to space the card port apart from the card track.

8. The apparatus of claim 1, further comprising a card reader assembly disposed between the first roller and the second roller, wherein the card reader assembly includes a card read head.

9. The apparatus of claim 8 wherein the card reader assembly further includes an optical scanner.

10. A card handling apparatus configured to receive and dispense cards from a card port, the card handling apparatus comprising:
    a card hopper including a side wall and a bottom wall configured to at least partially define a card exit slot, wherein the bottom wall includes a card eject surface, and wherein the card hopper is configured to hold a first card adjacent the card exit slot and at least a second card on to of the first card;
    a card track positioned adjacent to the card hopper, wherein the card track includes a card transport surface positioned below the card eject surface;
    a card ejector configured to drive the first card through the card exit slot and onto the card transport surface;
    at least a first roller positioned adjacent to the card transport surface, wherein the roller is configured to rotate in a first direction to move the first card away from the card hopper and toward the card port, and wherein the roller is further configured to rotate in a second direction to receive a third card from the card port and move the third card toward the card hopper;
    a second roller; and
    a drive assembly operably coupled to the first and second rollers, wherein the drive assembly is configured to rotate the first and second rollers simultaneously to deposit the first card into a card collection region positioned below the card hopper, and wherein the drive assembly is further configured to rotate the first and second rollers to dispense the second card from the card hopper and onto the card track and further toward the card port.

11. A card handling configured to receive and dispense cards from a card port, the card handling apparatus comprising:
    a card hopper including a side wall and a bottom wall configured to at least partially define a card exit slot, wherein the bottom wall includes a card eject surface, and wherein the card hopper is configured to hold a first card adjacent the card exit slot and at least a second card on top of the first card;
    a card track positioned adjacent to the card hopper, wherein the card track includes a card transport surface positioned below the card eject surface;
    a card ejector configured to drive the first card through the card exit slot and onto the card transport surface;
    at least a first roller positioned adjacent to the card transport surface, wherein the roller is configured to rotate in a first direction to move the first card away from the card hopper and toward the card port, and wherein the roller is further configured to rotate in a second direction to receive a third card, from the card port and move the third card toward the card hopper,
    a shaft operably coupled to the roller; and
    a chassis having a sidewall configured to carry at least a portion of the card track assembly, wherein the sidewall includes a biasing member urging the shaft towards the card track.

12. A card handling apparatus configured to receive a first card from a card port, comprising:

a card track having a first surface;
a card hopper having a second surface configured to hold a second card, at least one sidewall, and a gap defined by the sidewall and the second surface, wherein the second surface is spaced apart from and canted towards the first surface of the card track;
a card ejector configured to drive the second card through the gap of the card hopper;
a first roller configured to rotate to draw the first card from the card port and onto the card track, wherein the first roller is further configured to rotate to dispense the second card from the card port;
a second roller configured to rotate to deposit the first card into a card collection region below the card hopper, wherein the second roller is further configured to rotate to dispense the second card from the card hopper and onto the card track and further toward the card port; and
a card reader assembly disposed between the first roller and the second roller, wherein the card reader assembly includes a card read head and an optical scanner.

13. The apparatus of claim 12 wherein the first roller is configured to rotate in a first direction to draw the first card from the card port and onto the card track, and wherein the first roller is further configured to rotate in a second direction to dispense the second card from the card port.

14. The apparatus of claim 12 wherein the second roller is configured to rotate in a first direction to deposit the first card into the card collection region, and wherein the second roller is further configured to rotate in a second direction to dispense the second card from the card hopper and onto the card track.

15. The apparatus of claim 12 wherein the first roller is configured to rotate in a first direction to draw the first card from the card port and onto the card track, wherein the second roller is configured to rotate in the first direction to deposit the first card into the card collection region, wherein the second roller is further configured to rotate in a second direction to dispense the second card from the card hopper and onto the card track, and wherein the first roller is further configured to rotate in the second direction to dispense the second card from the card port.

16. A card handling apparatus configured to receive a first card from a card port, comprising:
a card track having a first surface;
a card hopper having a second surface configured to hold a second card, at least one sidewall, and a gap defined by the sidewall and the second surface, wherein the second surface is spaced apart from and canted towards the first surface of the card track, wherein the card hopper includes a retaining plate, and wherein the retaining plate is configured to cover a portion of the gap between the sidewall and the second surface of the card hopper;
a card ejector configured to drive the second card through the gap of the card hopper;
a first roller configured to rotate to draw the first card from the card port and onto the card track, wherein the first roller is further configured to rotate to dispense the second card from the card port; and
a second roller configured to rotate to deposit the first card into a card collection region below the card hopper, wherein the second roller is further configured to rotate to dispense the second card from the card hopper and onto the card track and further toward the card port.

17. A card handling apparatus configured to receive a first card from a card port, comprising:
a card track having a first surface;
a card hopper having a second surface configured to hold a second card placed thereon, wherein the second surface is spaced apart from and canted towards the first surface of the card track;
a card ejector configured to drive the second card from the card hopper;
a first roller configured to rotate to draw the first card from the card port and onto the card track, wherein the first roller is further configured to rotate to dispense the second card from the card port;
a second roller configured to rotate to deposit the first card into a card collection region below the card hopper, wherein the second roller is further configured to rotate to dispense the second card from the card hopper and onto the card track and further toward the card port; and
a card reader assembly disposed between the first roller and the second roller.

18. A card handling apparatus configured to receive a first card from a card port, comprising:
a card track having a first surface;
a card hopper having a second surface configured to hold a second card placed thereon, wherein the second surface is spaced apart from and canted towards the first surface of the card track, and wherein the card track is spaced apart from the card hopper to define a gap therebetween;
a card ejector configured to drive the second card from the card hopper;
a first roller configured to rotate to draw the first card from the card port and onto the card track, wherein the first roller is further configured to rotate to dispense the second card from the card port; and
a second roller configured to rotate and move the first card through the gap and into a card collection region below the card hopper, wherein the second roller is further configured to rotate to dispense the second card from the card hopper and onto the card track and further toward the card port.

19. The card handling apparatus of claim 18 wherein the card track is offset from the card hopper in a first direction and a second direction, perpendicular to the first direction, to define the gap therebetween.

20. A card handling apparatus configured to receive a first card from a card port, comprising:
a card track having a first surface;
a card hopper having a bottom wall and one or more side walls extending generally upward therefrom, the bottom wall having a generally upward-facing second surface configured to hold a second card placed flatwise thereon, wherein the second surface is spaced apart from and canted towards the first surface of the card track;
a card elector configured to drive the second card from the card hopper;
a first roller configured to rotate to draw the first card from the card port and onto the card track, wherein the first roller is further configured to rotate to dispense the second card from the card port; and
a second roller configured to rotate to deposit the first card into a card collection region below the card hopper, wherein the second roller is further configured to rotate to dispense the second card from the card hopper and onto the card track and further toward the card port,
wherein the first roller is configured to rotate in a first direction to draw the first card from the card port and onto the card track, and wherein the first roller is further configured to rotate in a second direction to dispense the second card from the card port.

21. The apparatus of claim 20, further comprising a card weight disposed within the card hopper and configured to press the second card toward the second surface of the card hopper.

22. A card handling apparatus configured to receive a first card from a card port, comprising:
- a card track having a first surface;
- a card hopper having a bottom wall and one or more side walls extending generally upward therefrom, the bottom wall having a generally upward-facing second surface configured to hold a second card placed flatwise thereon, wherein the second surface is spaced apart from and canted towards the first surface of the card track;
- a card ejector configured to drive the second card from the card hopper;
- a first roller configured to rotate to draw the first card from the card port and onto the card track, wherein the first roller is further configured to rotate to dispense the second card from the card port; and
- a second roller configured to rotate to deposit the first card into a card collection region below the card hopper, wherein the second roller is further configured to rotate to dispense the second card from the card hopper and onto the card track and further toward the card port,
- wherein the second roller is configured to rotate in a first direction to deposit the first card into the card collection region, and wherein the second roller is further configured to rotate in a second direction to dispense the second card from the card hopper and onto the card track and further toward the card port.

23. A card handling apparatus configured to receive a first card from a card port, comprising:
- a card track having a first surface
- a card hopper having a bottom wall and one or more side walls extending generally upward therefrom, the bottom wall having a generally upward-facing second surface configured to hold a second card placed flatwise thereon, wherein the second surface is spaced apart from and canted towards the first surface of the card track;
- a card elector configured to drive the second card from the card hopper:
- a first roller configured to rotate to draw the first card from the card port and onto the card track, wherein the first roller is further configured to rotate to dispense the second card from the card port; and
- a second roller configured to rotate to deposit the first card into a card collection region below the card hopper, wherein the second roller is further configured to rotate to dispense the second card from the card hopper and onto the card track and further toward the card port,
- wherein the first roller is configured to rotate in a first direction to draw the first card from the card port and onto the card track, wherein the second roller is configured to rotate in the first direction to deposit the first card into the card collection region, wherein the second roller is further configured to rotate in a second direction to dispense the second card from the card hopper and onto the card track, and wherein the first roller is further configured to rotate in the second direction to dispense the second card from the card port.

* * * * *

UNITED STATES PATENT AND TRADEMARK OFFICE
CERTIFICATE OF CORRECTION

PATENT NO. : 9,227,800 B2  
APPLICATION NO. : 13/803559  
DATED : January 5, 2016  
INVENTOR(S) : Douglas A. Martin Page 1 of 1

It is certified that error appears in the above-identified patent and that said Letters Patent is hereby corrected as shown below:

Claims

In column 16, line 15, in claim 10, delete "to" and insert -- top --, therefor.

In column 16, line 59, in claim 11, delete "card," and insert -- card --, therefor.

In column 16, line 60, in claim 11, delete "hopper," and insert -- hopper; --, therefor.

In column 20, line 3, in claim 23, delete "surface" and insert -- surface; --, therefor.

In column 20, line 9, in claim 23, delete "elector" and insert -- ejector --, therefor.

In column 20, line 10, in claim 23, delete "hopper:" and insert -- hopper; --, therefor.

Signed and Sealed this  
Nineteenth Day of April, 2016

Michelle K. Lee  
*Director of the United States Patent and Trademark Office*